US012634892B2

(12) United States Patent
Ding

(10) Patent No.: US 12,634,892 B2
(45) Date of Patent: May 19, 2026

(54) RESOURCE SELECTION METHOD AND APPARATUS IN CARRIER AGGREGATION SCENARIO, DEVICE, AND STORAGE MEDIUM

(71) Applicant: GUANGDONG OPPO MOBILE TELECOMMUNICATIONS CORP., LTD., Dongguan (CN)

(72) Inventor: Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 339 days.

(21) Appl. No.: 18/508,481

(22) Filed: Nov. 14, 2023

(65) Prior Publication Data

US 2024/0089925 A1 Mar. 14, 2024

Related U.S. Application Data

(63) Continuation of application No. PCT/CN2021/093921, filed on May 14, 2021.

(51) Int. Cl.
*H04W 72/02* (2009.01)
*H04W 72/0446* (2023.01)
*H04W 72/542* (2023.01)

(52) U.S. Cl.
CPC ....... *H04W 72/02* (2013.01); *H04W 72/0446* (2013.01); *H04W 72/542* (2023.01)

(58) Field of Classification Search
CPC ............. H04W 72/02; H04W 72/0453; H04W 72/0446; H04W 72/0457; H04W 72/542; H04W 72/40

(Continued)

(56) References Cited

U.S. PATENT DOCUMENTS

2020/0280915 A1 9/2020 Lu et al.
2021/0243749 A1* 8/2021 Hoang .................. H04W 72/02
(Continued)

FOREIGN PATENT DOCUMENTS

CN 109526056 A 3/2019
WO 2019095224 A1 5/2019
WO 2021030561 A1 2/2021

OTHER PUBLICATIONS

Extended European Search Report for European Patent Application No. EP21941398.6 mailed on Jun. 4, 2024.
ZTE et al., "Remaining issues of mode 2 operation on sidelink", 3GPP TSG RAN WG1 #100bis-e, R1-2001896, Apr. 11, 2020.
Huawei et al., "Remaining details of mode-4 resource selection and power sharing for eV2X", 3GPP TSG RAN WG1 Meeting #91, R1-1719511, Nov. 17, 2017.
(Continued)

*Primary Examiner* — Candal Elpenord
(74) *Attorney, Agent, or Firm* — Sheppard, Mullin, Richter & Hampton LLP

(57) ABSTRACT

The present disclosure relates to communication technology, and discloses a resource selection method and apparatus in a carrier aggregation scenario, a device, and a storage medium. The method includes: evaluating target resources in a target resource set at a second time instant according to a selected resource or scheduled resource on a second carrier. The target resource set includes a selected resource on a first carrier as indicated at a first time instant, and the second time instant is earlier than the first time instant. According to the present disclosure, the selected resource on the current carrier is evaluated according to the latest selected resource or scheduled resource on another carrier, at least before transmission on the selected resource of the current carrier. If the currently selected resource cannot be used for transmission, resource reselection can be triggered.

19 Claims, 6 Drawing Sheets

(58) Field of Classification Search
USPC .................................................. 370/329–330
See application file for complete search history.

(56) References Cited

U.S. PATENT DOCUMENTS

| 2021/0314966 | A1* | 10/2021 | Hui | ........................ | H04W 72/56 |
|---|---|---|---|---|---|
| 2021/0392547 | A1* | 12/2021 | Tang | ..................... | H04W 28/16 |
| 2021/0410129 | A1* | 12/2021 | Freda | .................... | H04W 72/20 |
| 2023/0189218 | A1* | 6/2023 | Shin | ........................ | H04L 5/001 |
| | | | | | 370/329 |
| 2023/0262662 | A1* | 8/2023 | Li | ......................... | H04L 5/0053 |
| | | | | | 370/330 |
| 2023/0362893 | A1* | 11/2023 | Shin | ...................... | H04L 1/1896 |
| 2024/0031995 | A1* | 1/2024 | Liu | ....................... | H04W 72/02 |

OTHER PUBLICATIONS

Oppo, "Discussion on remaining open issues for mode 2", 3GPP TSG-RAN WG1 Meeting #100bis-e, R1-2001749, Apr. 11, 2020.
International Search Report and Written Opinion dated Feb. 10, 2022 in International Application No. PCT/CN2021/093921. English translation attached.
CATT."Discussion on Carrier Aggregation for Mode 4 in V2X Phase 2" 3GPP TSG RAN WG1 Meeting #91 R1-1720158, Dec. 1, 2017(Dec. 1, 2017) entire document.
"3rd Generation Partnership Project;Technical Specification Group Radio Access Network;NR; Physical layer procedures for data(Release 16)"3GPP TS 38.214 V16.4.0, Jan. 2021, Section 8.1.4.
3GPP TS 36.213 V16.4.0,Jan. 2021, Section 14.1.1.6.

* cited by examiner

PSSCH

PSCCH

810

Evaluate target resources in a target resource set at a second time instant according to a selected resource or scheduled resource on a second carrier, the target resource set including a selected resource on a first carrier as indicated at a first time instant, and the second time instant being earlier than the first time instant

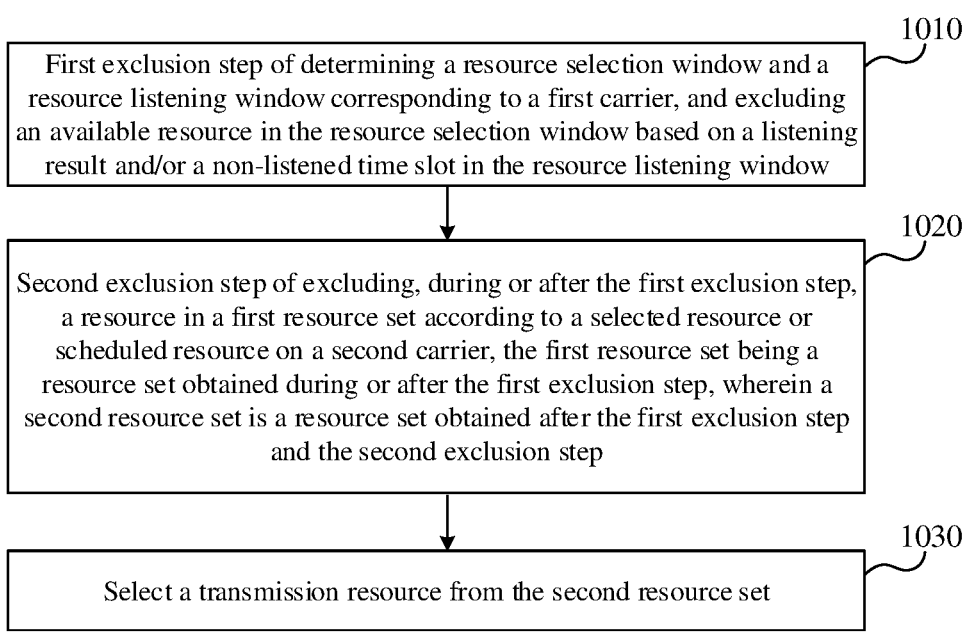

1010

First exclusion step of determining a resource selection window and a resource listening window corresponding to a first carrier, and excluding an available resource in the resource selection window based on a listening result and/or a non-listened time slot in the resource listening window

1020

Second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step

1030

Select a transmission resource from the second resource set

FIG. 10

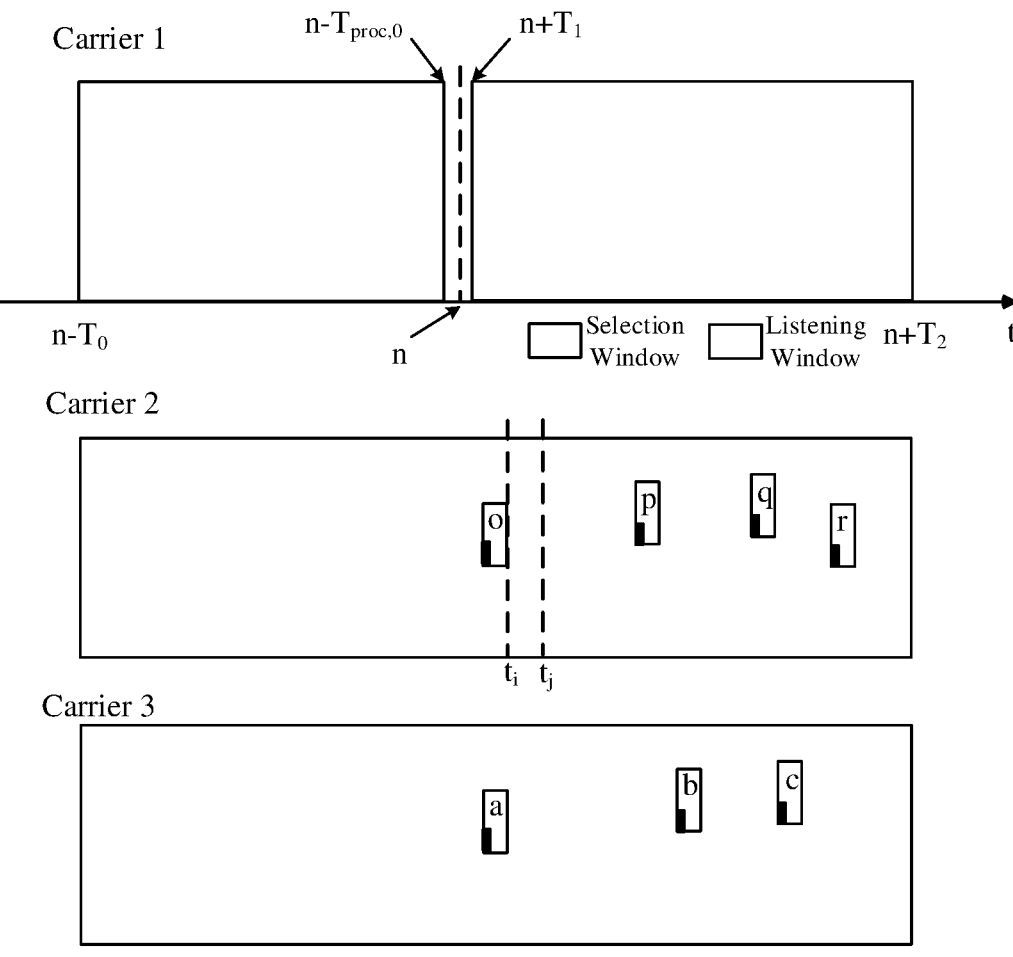

FIG. 11

Terminal Device 140

RESOURCE SELECTION METHOD AND APPARATUS IN CARRIER AGGREGATION SCENARIO, DEVICE, AND STORAGE MEDIUM

CROSS-REFERENCE TO RELATED APPLICATIONS

The application is a continuation of International Application No. PCT/CN2021/093921 filed on May 14, 2021, the entire content of which is incorporated herein by reference.

TECHNICAL FIELD

The present disclosure relates to communication technology, and more particularly, to a resource selection method and apparatus in a carrier aggregation scenario, a device, and a storage medium.

BACKGROUND

In Sidelink (SL) communication, a terminal device can select transmission resources from a resource pool by listening. In a Carrier Aggregation (CA) scenario supporting SL, further research is needed regarding resource selection by the terminal device.

SUMMARY

The embodiments of the present disclosure provide a resource selection method and apparatus in a carrier aggregation scenario, a device, and a storage medium. The technical solutions are as follows.

In an aspect of the embodiments of the present disclosure, a resource selection method in a carrier aggregation scenario is provided. The method is performed by a terminal device, and the method includes:

evaluating target resources in a target resource set at a second time instant according to a selected resource or scheduled resource on a second carrier.

The target resource set includes a selected resource on a first carrier as indicated at a first time instant, and the second time instant is earlier than the first time instant.

In an aspect of the embodiments of the present disclosure, a resource selection method in a carrier aggregation scenario is provided. The method is performed by a terminal device, and the method includes:

a first exclusion step of determining a resource selection window and a resource listening window corresponding to a first carrier, and excluding an available resource in the resource selection window based on a listening result and/or a non-listened time slot in the resource listening window;

a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step; and selecting a transmission resource from the second resource set.

In an aspect of the embodiments of the present disclosure, a resource selection apparatus in a carrier aggregation scenario is provided. The apparatus includes:

an evaluating module configured to evaluate target resources in a target resource set at a second time instant according to a selected resource or scheduled resource on a second carrier.

The target resource set includes a selected resource on a first carrier as indicated at a first time instant, and the second time instant is earlier than the first time instant.

In an aspect of the embodiments of the present disclosure, a resource selection apparatus in a carrier aggregation scenario is provided. The apparatus includes:

an excluding module configured to perform a first exclusion step of determining a resource selection window and a resource listening window corresponding to a first carrier, and excluding an available resource in the resource selection window based on a listening result and/or a non-listened time slot in the resource listening window, wherein the excluding module is further configured to perform a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step; and a selecting module configured to select a transmission resource from the second resource set.

In an aspect of the embodiments of the present disclosure, a terminal device is provided. The terminal device includes a processor.

The processor is configured to evaluate target resources in a target resource set at a second time instant according to a selected resource or scheduled resource on a second carrier.

The target resource set includes a selected resource on a first carrier as indicated at a first time instant, and the second time instant is earlier than the first time instant.

In an aspect of the embodiments of the present disclosure, a terminal device is provided. The terminal device includes a processor.

The processor is configured to perform a first exclusion step of determining a resource selection window and a resource listening window corresponding to a first carrier, and excluding an available resource in the resource selection window based on a listening result and/or a non-listened time slot in the resource listening window.

The processor is further configured to perform a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step.

The processor is further configured to select a transmission resource from the second resource set.

In an aspect of the embodiments of the present disclosure, a computer-readable storage medium is provided. The computer-readable storage medium has a computer program stored therein. The computer program is configured to be executed by a processor to perform the above resource selection method in the carrier aggregation scenario.

In an aspect of the embodiments of the present disclosure, a chip is provided. The chip includes a programmable logic circuit and/or program instructions. The chip is configured to, when running, perform the above resource selection method in the carrier aggregation scenario.

In an aspect of the embodiments of the present disclosure, a computer program product or computer program is provided. The computer program product or computer program includes computer instructions stored in a computer-readable storage medium. A processor is configured to read and execute the computer instructions from the computer-readable storage medium to perform the above resource selection method in the carrier aggregation scenario.

The technical solutions according to the embodiments of the present disclosure may include the following advantageous effects.

According to the present disclosure, the selected resource on the current carrier is evaluated according to the latest selected resource or scheduled resource on another carrier, at least before transmission on the selected resource of the current carrier. If the currently selected resource cannot be used for transmission, resource reselection can be triggered. In this way, the problem of inaccurate resource exclusion when the terminal device initially selects resources can be solved, and the accuracy of resource selection in the carrier aggregation scenario can be improved.

BRIEF DESCRIPTION OF DRAWINGS

FIG. 10 is a flowchart illustrating a resource selection method in a carrier aggregation scenario according to another embodiment of the present disclosure;

FIG. 11 is a schematic diagram showing a resource selection scheme in the embodiment of FIG. 10;

DESCRIPTION OF EMBODIMENTS

The embodiments of the present disclosure will be further described in detail below with reference to the accompanying drawings, such that the objects, technical solutions, and advantages of the present disclosure will become more apparent.

The network architecture and service scenario described in the embodiments of the present disclosure are provided for illustrating the technical solutions of the embodiments of the present disclosure more clearly, and do not constitute limitations on the technical solutions according to the embodiments of the present disclosure. It is known by those skilled in the art that, with the evolution of the technology and the emergence of new service scenarios, the technical solutions provided in the embodiments of the present disclosure are also applicable to similar technical problems.

Figure 1:
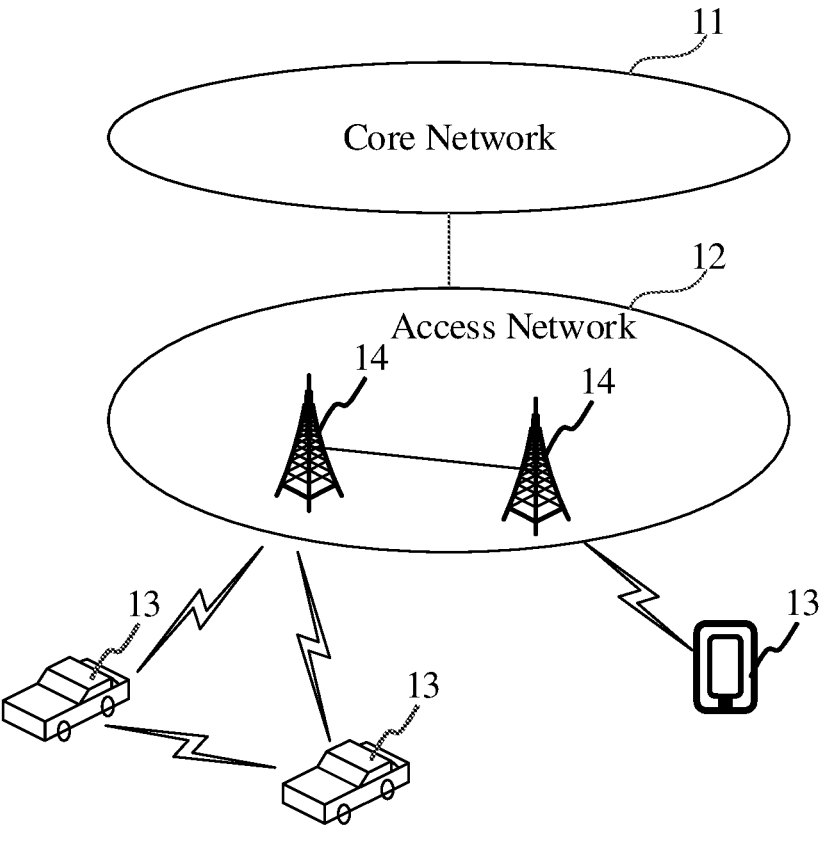
FIG. 1 is a schematic diagram showing a network architecture according to an embodiment of the present disclosure.

Referring to FIG. 1, which is a schematic diagram showing a network architecture according to an embodiment of the present disclosure, the network architecture may include: a core network 11, an access network 12 and terminal devices 13.

The core network 11 includes a number of core network devices. The functions of the core network devices are mainly to provide user connections, user management, and bearers for services, and provide interfaces to external networks as a bearer network. For example, the core network of the 5th Generation (5G) New Radio (NR) system may include devices such as an Access and Mobility Management Function (AMF) entity, a User Plane Function (UPF) entity, and a Session Management Function (SMF) entity.

The access network 12 includes a number of access network devices 14. The access network in the 5G NR system may be referred to as New Generation-Radio Access Network (NG-RAN). The access network devices 14 are devices deployed in the access network 12 to provide wireless communication functions for the terminal device 13. The access network device 14 may include various forms of base stations, such as macro base stations, micro base stations, relay stations, access points, and so on. In systems using different wireless access technologies, the name of the device with the access network device function may be different. For example, in the 5G NR system, it is referred to as gNodeB or gNB. With the evolution of communication technology, the name "access network device" may change. For the convenience of description, in the embodiments of the present disclosure, the above devices that provide the wireless communication function for the terminal device 13 are collectively referred to as access network devices.

There are typically a plurality of terminal devices 13, and one or more terminal devices 13 may be distributed in a cell managed by each access network device 14. The terminal device 13 may include various devices with wireless communication functions, such as handheld devices, vehicle-mounted devices, wearable devices, computing devices or other processing devices connected to wireless modems, as well as various forms of user equipment, Mobile Stations (MSs) etc. For convenience of description, the devices mentioned above are collectively referred to as terminal devices. The access network device 14 and the core network device communicate with each other using some air technology, such as the NG interface in the 5G NR system. The access network device 14 and the terminal device 13 communicate with each other via some air technology, such as Uu interface.

The terminal device 13 and the terminal device 13 (such as a vehicle-mounted device and another device (such as another vehicle-mounted device, a mobile phone, a Road Side Unit (RSU), etc.)) can communicate with each other via a direct communication interface (such as PC5 interface).

Correspondingly, the communication link established based on the direct communication interface may be referred to as a direct link or SL. SL transmission is direct communication/data transmission between terminal devices via a sidelink. Unlike traditional cellular systems where communication data is received or transmitted via access network devices, SL transmission has characteristics such as low delay and low overhead, and is suitable for communication between two terminal devices with close geographical locations (such as a vehicle-mounted device and another peripheral device at a close geographical location). It should be noted that in FIG. 1, for example only, in the vehicle-to-vehicle communication in the vehicle to everything (V2X) scenario, the SL technology can be applied to various scenarios in which terminal devices communicate directly with each other. In other words, the terminal device in the present disclosure refers to any device that communicates using the SL technology.

The "5G NR system" in the embodiments of the present disclosure may also be referred to as a 5G system or an NR system, and those skilled in the art can understand its meaning. The technical solution described in the embodiments of the present disclosure may be applicable to the 5G NR system, and may also be applicable to a subsequently evolved system of the 5G NR system.

Regarding SL transmission, the 3GPP defines two transmission modes: Mode A and Mode B.

Mode A: Transmission resources of a terminal device are allocated by an access network device (such as a base station), and the terminal device transmits communication data on a sidelink according to the transmission resources allocated by the access network device. Here, the access network device may allocate transmission resources for a single transmission to the terminal device, or allocate transmission resources for semi-static transmission to the terminal device.

Mode B: A terminal device autonomously selects transmission resources from a resource pool for transmitting communication data. Specifically, the terminal device may select transmission resources from the resource pool by listening, or select transmission resources from the resource pool randomly.

Next, a method for a terminal device to select resources autonomously (that is, the above Mode B) in SL communication in the NR V2X system will be mainly introduced.

Figure 2:
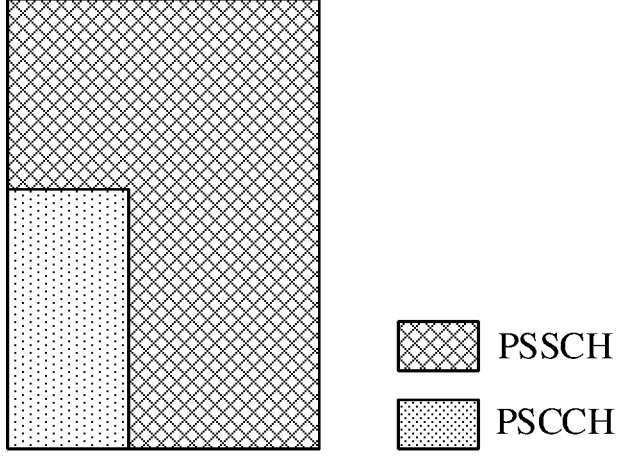
FIG. 2 is a schematic diagram showing a physical layer structure of SL communication according to an embodiment of the present disclosure.

The physical layer structure of SL communication in the NR V2X system is shown in FIG. 2. The Physical Sidelink Control Channel (PSCCH) is used to carry first sidelink control information, and the Physical Sidelink Shared Channel (PSSCH) is used to carry data and second sidelink control information. The PSCCH and PSSCH are transmitted in the same slot. The above first sidelink control information and second sidelink control information may be two types of sidelink control information with different functions. For example, the first sidelink control information is carried in the PSCCH, and mainly includes fields related to resource listening, such that other terminal devices can perform resource exclusion and resource selection after decoding the information. In addition to data, the PSSCH also carries the second sidelink control information, which mainly includes fields related to data demodulation, so as to allow other terminal devices to demodulate the data in the PSSCH.

In the NR V2X system, in the above Mode B, the terminal device selects transmission resources autonomously for transmitting data. Resource reservation is the premise of resource selection.

The resource reservation means that the terminal device transmits the first sidelink control information in the PSCCH to reserve resources to be used. In the NR V2X system, intra-Transport Block (TB) resource reservation and inter-TB resource reservation are both supported.

Figure 3:
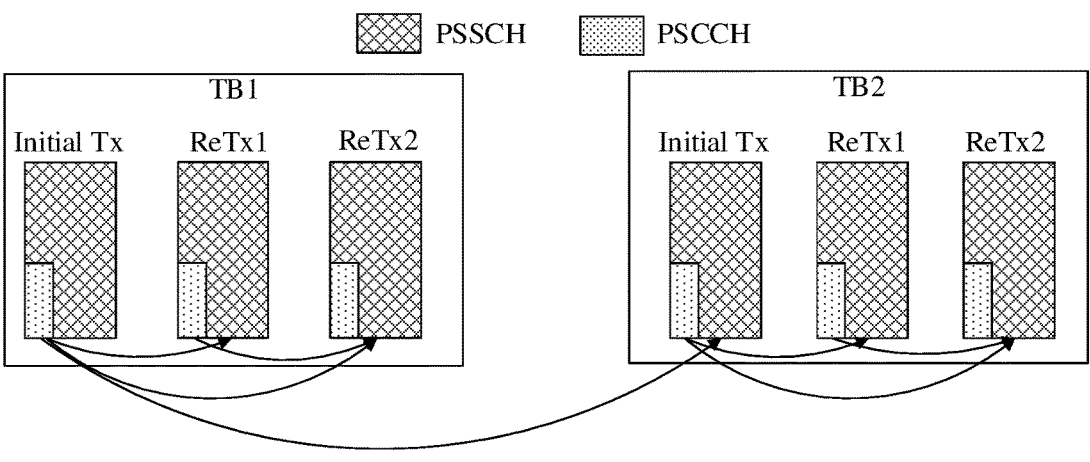
FIG. 3 is a schematic diagram showing time-frequency resource position reservation according to an embodiment of the present disclosure.

As shown in FIG. 3, the terminal device transmits the first sidelink control information, and uses the "Time resource assignment" and "Frequency resource assignment" fields to indicate N time-frequency resources of the current TB (including resources currently used for transmission). Here $N \leq Nmax$, and in NR V2X, Nmax is equal to 2 or 3. At the same time, the above indicated N time-frequency resources should be distributed in W time slots. In NR V2X, W is equal to 32. For example, in TB1 shown in FIG. 3, the terminal device transmits initial transmission data on a PSSCH and transmits the first sidelink control information on a PSCCH, and uses the above two fields to indicate the time-frequency resource positions of the initial transmission and Retransmission 1 (that is, at this time, N=2). That is, time-frequency resources for Retransmission 1 are reserved. Moreover, the initial transmission and Retransmission 1 are distributed in 32 time slots in the time domain. Similarly, in TB1 shown in FIG. 3, the terminal device uses the first sidelink control information transmitted in the PSCCH of Retransmission 1 to indicate the time-frequency resource positions of Retransmission 1 and Retransmission 2, and Retransmission 1 and Retransmission 2 are distributed in 32 time slots in the time domain.

At the same time, when the terminal device transmits the first sidelink control information, the "Resource reservation period" field is used for inter-TB resource reservation. For example, in FIG. 3, when the terminal device transmits the first sidelink control information of the initial transmission of TB1, it uses the "Time resource assignment" and "Frequency resource assignment" fields to indicate the time-frequency resource positions of the initial transmission and Retransmission 1 of TB1, denoted as $\{(t1, f1), (t2, f2)\}$. Here, $t_1$ and $t_2$ represent the time domain positions of the resources for the initial transmission and Retransmission 1 of TB1, and $f_1$ and $f_2$ represent corresponding frequency domain positions, respectively. If the value of the "Resource reservation period" field in the first sidelink control information is 100 milliseconds, then the Sidelink Control Information (SCI) also indicates the time-frequency resources $\{(t1+100, f1), (t2+100, f2)\}$, which are used for the initial transmission and Retransmission 1 of TB2. Similarly, the first sidelink control information transmitted in Retransmission 1 of TB1 also uses the "Resource reservation period" field to reserve the time-frequency resources for Retransmission 1 and Retransmission 2 of TB2. In NR V2X, the possible values of the "Resource reservation period" field are 0, 1-99, 100, 200, 300, 400, 500, 600, 700, 800, 900, and 1000 milliseconds. Compared with Long Term Evaluation (LTE), V2X is more flexible. However, in each resource pool, only e values among the values are configured, and the terminal device determines possible values according to the used resource pool. Note that the e values in the resource pool configuration is a resource reservation period set M. For example, e is smaller than or equal to 16.

In addition, with network configuration or pre-configuration, the above inter-TB reservation can be activated or deactivated in units of resource pools. When the inter-TB reservation is activated, the "Resource reservation period" field is included in the first sidelink control information. When the inter-TB reservation is deactivated, the "Resource reservation period" field is not included in the first sidelink control information. When the inter-TB reservation is activated, generally, before resource reselection is triggered, the value of the "Resource reservation period" field used by the terminal device, i.e., the resource reservation period, will not change. Each time the terminal device transmits the first sidelink control information, it uses the "Resource reservation period" field to reserve resources of the next period for transmission of another TB, so as to achieve periodic, semi-persistent transmission.

When the terminal device operates in the above Mode B, the terminal device can obtain first sidelink control information transmitted by other terminal devices by listening to PSCCHs transmitted by the other terminal devices, so as to know the resources reserved by the other terminal devices. When a terminal device selects a resource, it will exclude resources reserved by other terminal devices, thereby avoiding resource collisions.

In the NR V2X system, in the above Mode B, the terminal device needs to select resources autonomously.

Figure 4:
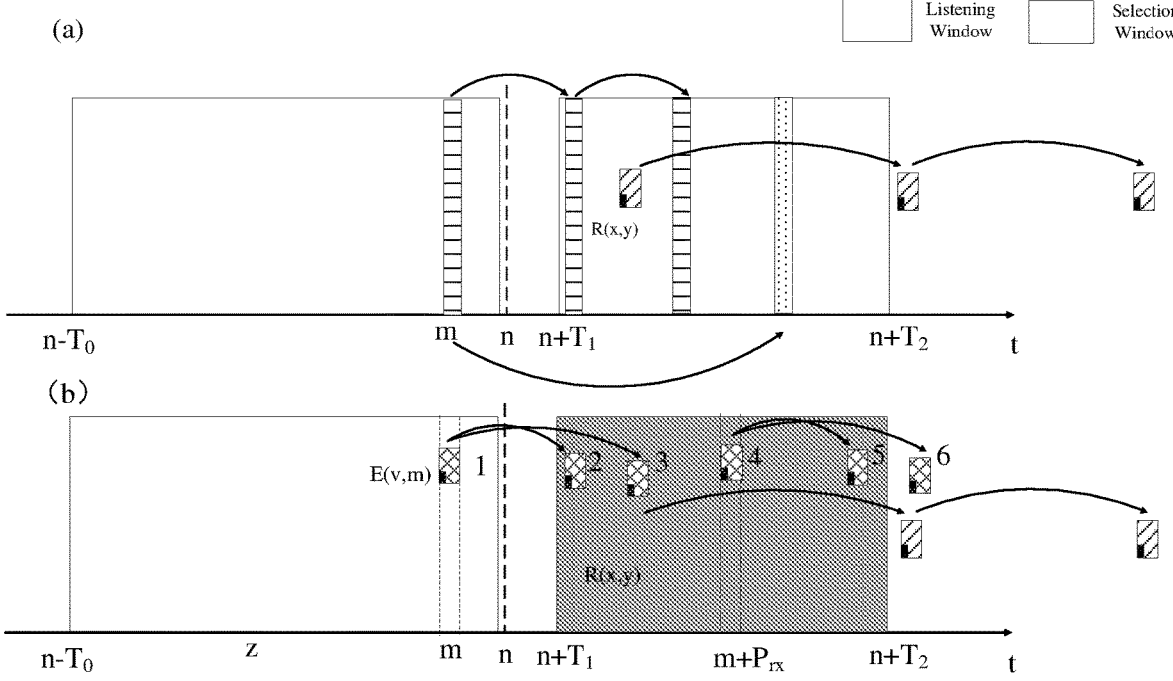
FIG. 4 is a schematic diagram showing resource listening and resource selection according to an embodiment of the present disclosure.

As shown in FIG. 4, the terminal device triggers resource selection or reselection in time slot n or time slot n is the time slot at which a higher layer triggers the physical layer to report a candidate resource set, and a resource selection window starts from $n+T_1$ and ends at $n+T_2$. $0<=T_1<=T_{proc,1}$, when the subcarrier spacing is 15, 30, 60, or 120 kHz, $T_{proc,1}$ is 3, 5, 9, or 17 time slots. $T_{2min}<=T_2<=$the remaining budget of the service, the value set of $T_{2min}$ is {1, 5, 10, 20}*$2^\mu$ time slots, where $\mu=0$, 1, 2, 3 corresponds to the subcarrier spacing of 15, 30, 60, or 120 kHz. The terminal device determines $T_{2min}$ from the value set according to the priority of the data to be transmitted by the terminal device. For example, when the subcarrier spacing is 15 kHz, the terminal device determines $T_{2min}$ from the set {1, 5, 10, 20} according to the priority of its data to be transmitted by the terminal device. When $T_{2min}$ is greater than or equal to the remaining delay budget of the service, $T_2$ is equal to the remaining delay budget of the service. The remaining delay budget is the difference between the time corresponding to the data delay requirement and the current time. For example, for a data packet arriving in time slot n, the delay requirement is 50 milliseconds. Assuming that a time slot is 1 millisecond, if the current time is time slot n, the remaining delay budget is 50 milliseconds. If the current time is time slot n+20, the remaining delay budget is 30 milliseconds.

The terminal device performs resource listening from $n-T_0$ to $n-T_{proc,0}$ ($n-T_{proc,0}$ is not included), and the value of $T_0$ is 100 or 1100 milliseconds. When the subcarrier spacing is 15, 30, 60, or 120 kHz, $T_{proc,0}$ is 1, 1, 2, or 4 time slots. In fact, the terminal device listens to the first sidelink control information transmitted by other terminal devices in each time slot (except its own transmission time slot). When resource selection or reselection is triggered in time slot n, the terminal device uses resource listening results from $n-T_0$ to $n-T_{proc,0}$.

Step 1: The terminal device takes all the available resources belonging to the resource pool used by the terminal device in the resource selection window as a resource set A, and any resource in the set A is denoted as R(x, y), where x and y represent the frequency domain position and the time domain position of the resource, respectively. The initial number of resources in the set A is denoted as $M_{total}$. The terminal device excludes resources in the resource set A according to a non-listened time slot (Step 1-1) in the resource listening window and/or a resource listening result (Step 1-2) in the resource listening window. The terminal device determines whether the resource R(x, y) or a series of periodic resources corresponding to the resource R(x, y) overlaps the time slot determined in Step 1-1 according to the non-listened time slot or according to the resources determined according to the detected first sidelink control information in Step 1-2, and if so, the resource R(x,y) is excluded from the resource set A.

Step 1-1: If the terminal device transmits data and does not listen in time slot m within the listening window, the terminal device will use time slot m and each allowed resource reservation period in the resource pool used by the terminal device as an interval, to determine Q corresponding time slots. If the Q time slots overlap the resource R(x,y) or a series of periodic resources corresponding to the resource R(x,y), then the resource R(x,y) is excluded from the resource set A. Here, Q=1 or Q=$\lceil T_{scal}/P_{rx} \rceil$ (represents ceiling operation). $T_{scal}$ is equal to the value of $T_2$ converted into milliseconds. $P_{rx}$ is one of the resource reservation periods allowed by the resource pool used by the terminal device.

For example, in the sub-figure (a) in FIG. 4, the terminal device does not listen in time slot m, and performs resource exclusion according to each resource reservation period in the resource reservation period set M in the used resource pool configuration. For a certain resource reservation period 1, assuming that the Q value is calculated as 2, the corresponding Q time slots are the next two time slots shaded with horizontal lines that are mapped from time slot m in FIG. 4 (a) with the resource reservation period 1 as the interval. For the resource reservation period 2, assuming that the Q value is calculated as Q=1, the corresponding Q time slots are the next one time slot shaded with dots that is mapped from the time slot m in FIG. 4 (a) with the resource reservation period 2 as the interval.

The terminal device will determine whether the Q time slots corresponding to each reserved period overlap the resource R(x, y) or a series of periodic resources corresponding to the resource R(x, y), and if so, exclude the resource R(x,y) from the resource set A.

Optionally, when the inter-TB reservation is deactivated in the resource pool used by the terminal device, the terminal device may not perform the above Step 1-1.

Step 1-2: If the terminal device detects the first sidelink control information transmitted in the PSCCH within the time slot m of the resource listening window, it measures the Sidelink Reference Signal Received Power (SL-RSRP) of the PSCCH or the SL-RSRP of the PSSCH scheduled by the PSCCH (that is, the SL-RSRP of the PSSCH transmitted in the same time slot as the PSCCH).

If the measured SL-RSRP is greater than an SL-RSRP threshold, and the inter-TB reservation is activated in the resource pool used by the terminal device, the terminal device will use time slot m and the resource reservation period carried in the detected first sidelink control information as an interval to determine corresponding Q time slots. The terminal device assumes that it has also received the first sidelink control information with the same content in the Q time slots. The terminal device will determine whether the resource indicated in the "Time resource assignment" and "Frequency resource assignment" fields of the first sidelink control information received in time slot m and the Q pieces of assumedly received first sidelink control information overlap the resource R(x, y) or a series of periodic resources corresponding to the resource R(x, y), and if so, exclude the corresponding resource R(x, y) from the set A. Here, Q=1 or Q=$\lceil T_{scal}/P_{rx} \rceil$ (represents ceiling operation). $T_{scal}$ is equal to the value of $T_2$ converted into milliseconds. $P_{rx}$ is the resource reservation period carried in the detected first sidelink control information.

For example, in the sub-figure (b) in FIG. 4, when the inter-TB reservation is activated in the resource pool used by the terminal device, if the terminal device detects the first sidelink control information in the PSCCH on the resource E(v,m) of time slot m, the resource reservation period in the first sidelink control information is $P_{rx}$, assuming that the Q value is calculated as 1, the terminal device will assume that the first sidelink control information with the same content is also received in time slot m+$P_{rx}$. The terminal device will determine whether Resources 1, 2, 3, 4, 5, and 6 indicated in the "Time resource assignment" and "Frequency resource assignment" fields of the first sidelink control information received in time slot m and the first sidelink control information assumedly received in time slot m+$P_{rx}$ overlap the resource R(x, y) or a series of periodic resources corresponding to the resource R(x, y), and if so and if the RSRP condition is met, exclude the resource R(x,y).

If the SL-RSRP measured by the terminal device is greater than the SL-RSRP threshold, and the inter-TB reservation is deactivated in the resource pool used by the terminal device, the terminal device simply determines whether the resources indicated in the "Time Resource assignment" and "Frequency resource assignment" fields of the first sidelink control information received in time slot m overlap the resource R(x, y) or a series of resources corresponding to the resource R(x, y), and if so, exclude the resource R(x, y) from the resource set A.

For example, in the sub-figure (b) in FIG. 4, when the inter-TB reservation is deactivated in the resource pool used by the terminal device, if the terminal device detects the first sidelink control information in the PSCCH on the resource E(v,m) of time slot m, the terminal device determines whether resources 1, 2, and 3 indicated in the fields "Time resource assignment" and "Frequency resource assignment" in the first sidelink control information overlap the resource R(x, y) or a series of resources corresponding to the resource R(x, y), and if so and if the RSRP condition is met, exclude the resource R(x,y) from the resource set A.

If the remaining resources in the resource set A are less than $M_{total}$*X after the above resource exclusion, the SL-RSRP threshold is increased by 3 dB and Step 1 is performed again. The physical layer reports the resource set A after the resource exclusion as a candidate resource set to the higher layer.

Step 2: The higher layer randomly selects a resource from the reported candidate resource set for transmitting data. That is, the terminal device randomly selects a resource from the candidate resource set for transmitting data.

The following is worth noting.

1. The above RSRP threshold is determined by a priority P1 carried in the PSCCH detected by the terminal device and a priority P2 of data to be transmitted by the terminal device. The configuration of the resource pool used by the terminal device includes an SL-RSRP threshold table, which includes SL-RSRP thresholds corresponding to all priority combinations. The configuration of the resource pool can be configured by the network or pre-configured.

For example, as shown in Table 1, assuming that the priority levels of P1 and P2 are both 0-7, the SL-RSRP thresholds corresponding to different priority combinations are represented by γij, where i in γij is the value of the priority level P1, j is the value of the priority level P2.

TABLE 1

| | SL-RSRP Threshold Table | | | | | | | |
|---|---|---|---|---|---|---|---|---|
| | | | | P2 | | | | |
| P1 | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When the terminal device detects a PSCCH transmitted by another terminal device, and obtains the priority P1 carried in the first sidelink control information transmitted in the PSCCH and the priority P2 of the data to be transmitted, the terminal device determines the SL-RSRP threshold by looking up Table 1.

2. Whether the terminal device uses the measured PSCCH-RSRP or the PSSCH-RSRP scheduled by the PSCCH for comparison with the SL-RSRP threshold depends on the resource pool configuration of the resource pool used by the terminal device. The configuration of the resource pool can be configured by the network or pre-configured.

3. For the above X, the possible values of X are {20%, 35%, 50%}. The configuration of the resource pool used by the terminal device includes a correspondence between priorities and the above possible values, and the terminal device determines the value of X according to the priority of the data to be transmitted and the correspondence. The resource pool configuration can be configured by the network or pre-configured.

In addition, NR-V2X also supports re-evaluation of resources that have been selected but not indicated by transmitting the first sidelink control information after resource selection is completed.

Figure 5:
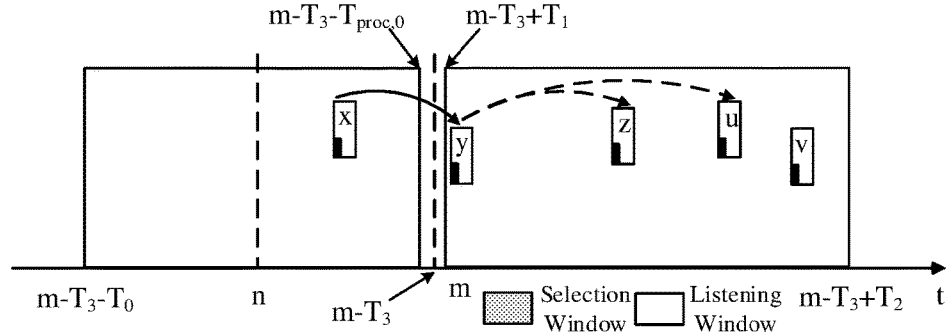
FIG. 5 is a schematic diagram showing resource re-evaluation according to an embodiment of the present disclosure.

As shown in FIG. 5, Resources x, y, z, u, and v are time-frequency resources selected by the terminal device in time slot n, and Resource y is located in time slot m. For resources z and u to be indicated first by the terminal device by transmitting the first sidelink control information on Resource y (Resource y has been indicated in the first sidelink control information in Resource x), the terminal device at least performs the above Step 1 once in time slot m−$T_3$. That is, at least in time slot m−$T_3$, it determines the resource selection window and the resource listening window as above, and performs the above Step 1 to exclude resources in the resource selection window to obtain a candidate resource set. If Resource z or u is not in the candidate resource set, the terminal device performs the above Step 2 to reselect the time-frequency resources in Resources z and u that are not in the candidate resource set. Depending on the implementation of the terminal device, the terminal device can also reselect any resource that has been selected but not indicated by transmitting the first sidelink control information, for example, any one or more resources among Resources z, u and v. The above $T_3$ is equal to $T_{proc,1}$. In FIG. 5, the dotted arrow indicates that the first sidelink control information indication is about to be transmitted, and the solid arrow indicates that the first sidelink control information indication has been transmitted.

The above introduction relates to an SL communication method in NR-V2X, that is, the terminal device autonomously selects transmission resources by resource listening, and autonomously performs data transmission on the sidelink. This SL communication method can also be applied to various SL communications such as direct communication between handheld terminals and direct communication between pedestrians and vehicles.

In LTE-V2X, sidelink Carrier Aggregation (CA) is supported, and terminal device can transmit data in parallel on one or more carriers, thereby improving the throughput of the sidelink transmission system.

In the CA scenario in LTE-V2X, in the above Mode B, the terminal device also needs to exclude resources according to resource listening and/or non-listened subframes, obtain a candidate resource set, and then select resources from the candidate resource set for transmitting data. Due to some constraints, after obtaining the candidate resource set, it is necessary to further exclude candidate resources that cannot be used for transmission by the terminal device from the candidate resource set before reporting to the higher layer.

Figures 6, 7:
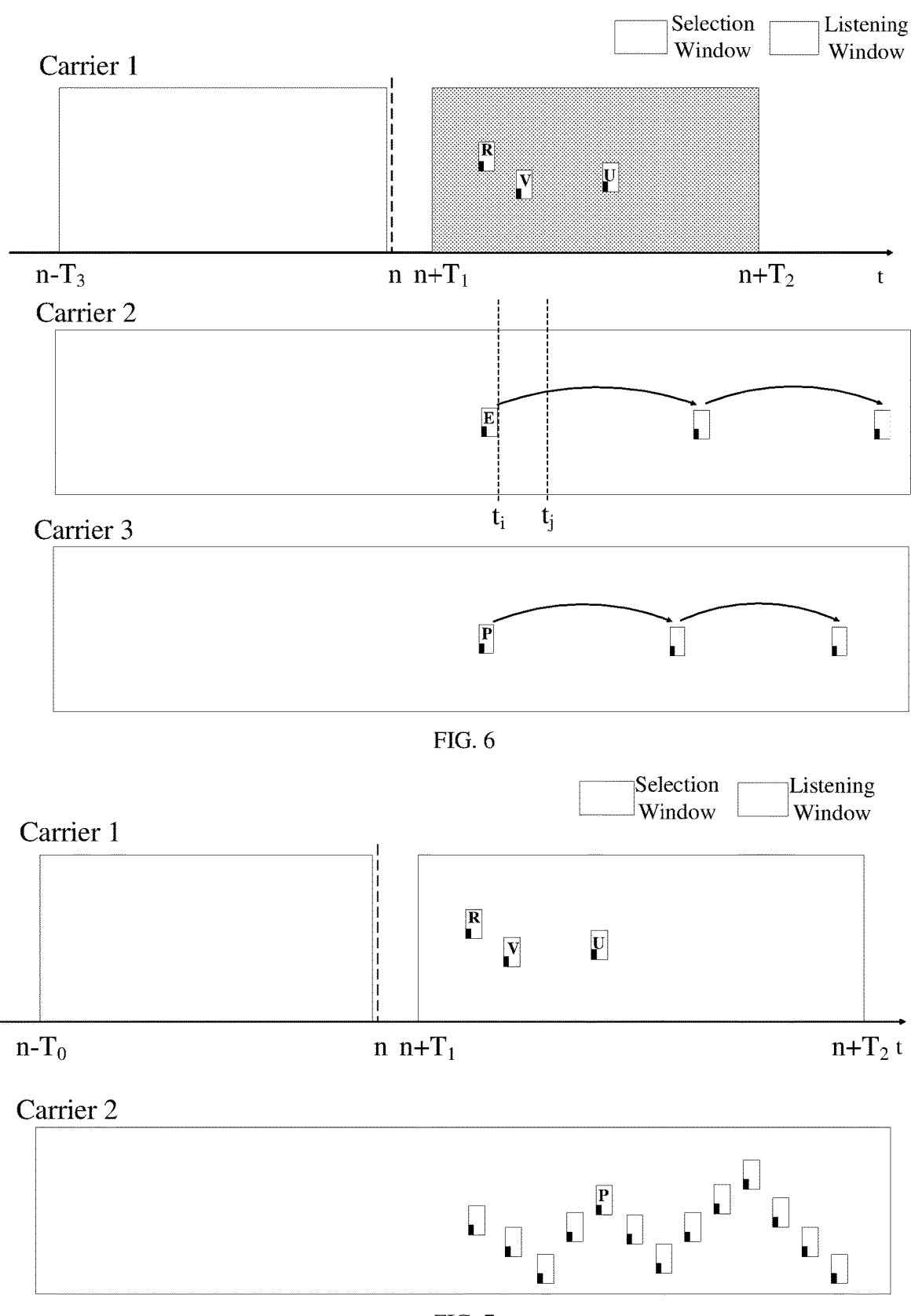
FIG. 6 is a schematic diagram showing resource selection in a CA scenario according to an embodiment of the present disclosure.
FIG. 7 is a schematic diagram showing resource selection in a CA scenario according to another embodiment of the present disclosure.

For example, in FIG. 6, the terminal device triggers resource selection or reselection in subframe n, and selects resources on carrier 1. The terminal device determines a resource selection window and a resource listening window, performs resource exclusion, and obtains a candidate resource set including Resource R, Resource V, and Resource U. Due to the following constraints, the terminal device further excludes candidate resources that cannot be used for transmission from the candidate resource set.

Condition 1: The number of carriers for simultaneous transmissions supported by the terminal device For example, a terminal device only supports simultaneous transmissions on two carriers, and the terminal device has selected Resources E and P on carrier 2 and carrier 3 respectively, and Resources E and P overlap Resource R in the time domain. Thus, the terminal device needs to exclude Resource R from the candidate resource set. The reason is that if Resource R is selected, the terminal device needs to transmit on three carriers simultaneously, which is beyond the capability of the terminal device.

Condition 2: Limitations of Carrier Aggregation or Combination

For example, a terminal device does not support aggregation or combination on carrier 1 and carrier 2, that is, it cannot transmit on carrier 1 when transmitting on carrier 2. If the terminal device selects Resource E on carrier 2, and Resource E and Resource R overlap in the time domain, the terminal device needs to exclude Resource R from the candidate resource set.

Condition 3: Interruption due to Radio Frequency (RF) readjustment

For example, a terminal device does not support aggregation or combination on carrier 1 and carrier 2, that is, it cannot transmit on carrier 1 when transmitting on carrier 2. If it needs to transmit on carrier 1 after the transmission on carrier 2 is completed, it needs to readjust hardware or RF of the device before transmitting on carrier 1. During the readjustment period, the terminal device cannot transmit. For example, after the terminal device transmits on Resource E of carrier 2, it needs to perform RF adjustment in subframes $t_i$ to $t_j$, and Resource V overlaps subframes $t_i$ to $t_j$ in the time domain, then the terminal device needs to exclude resource V from the candidate resource set.

In another example, a terminal device supports two sets of radio frequencies, or two RF chains. Radio frequency chain 1 is used for transmission on carrier 1 and carrier 2, and radio frequency chain 2 is used for transmission on carrier 3. Therefore, the terminal device needs to adjust the radio frequency chain 1 to support transmission on the two carriers. Similarly, if the time for the terminal device to perform RF readjustment after transmission on Resource E of carrier 2 overlaps Resource V in the time domain, the terminal device excludes Resource V from the candidate resource set.

The resource selection scheme in the CA scenario in LTE-V2X has been introduced above. Currently, no resource selection scheme in the CA scenario in NR-V2X has been discussed in the standard.

Moreover, according to the above description, it can be known that if the method in LTE-V2X is reused such that resource exclusion is performed on the candidate resource set on the current carrier according to selected resources on other carriers to exclude the resources that the terminal device cannot use for transmission, there will be the following problems.

Problem 1: In NR-V2X, a TB can be transmitted up to 32 times, and Hybrid Automatic Repeat reQuest (HARM) retransmission is supported. When a receiver feeds back an Acknowledgment (ACK) for a TB, indicating that the reception is successful, a transmitter can release the unused selected resources. In FIG. 7, the terminal device triggers resource selection in time slot n, selects resources on carrier 1, and determines a candidate resource set. On carrier 2, the terminal device has selected a large number of resources for one TB. If resources that cannot be used for transmission in the candidate resource set are excluded according to the selected resources on carrier 2, a large number of candidate resources will be excluded. After time slot n, if the terminal device receives an ACK on carrier 2 and releases the unused selected resources, it is equivalent to giving up many candidate resources that could have been used by the terminal device when performing resource selection in time slot n on carrier 1.

Problem 2: In NR-V2X, after the resource selection is completed, the terminal device further supports re-selection of the selected resources by means of re-evaluation and other mechanisms. Also for example in FIG. 7, the terminal device triggers resource selection in time slot n, selects resources on carrier 1, and determines a candidate resource set. The candidate resource set includes Resources R, V, and U. The terminal device excludes the candidate resource U based on the selected resource P on carrier 2. However, if the terminal device reselects Resource P after time slot n, it is equivalent to excluding the candidate resource U that could have been used when the terminal device selects resources in time slot n.

In view of the problem of inaccurate resource exclusion when terminal device initially selects resources, referring to the idea of re-evaluation mechanism in NR-V2X, the present disclosure proposes that the selected resource on the current carrier is evaluated according to the latest selected resource or scheduled resource on another carrier, at least before transmission on the selected resource of the current carrier (e.g., before indication of or transmission on the selected resource of the current carrier). If the currently selected resource cannot be used for transmission, resource reselection can be triggered. In this way, the problem of inaccurate resource exclusion when the terminal device initially selects resources can be solved, and the accuracy of resource selection in the carrier aggregation scenario can be improved.

In the following, the technical solutions of the present disclosure will be described with reference to several exemplary embodiments.

Figures 8, 9:
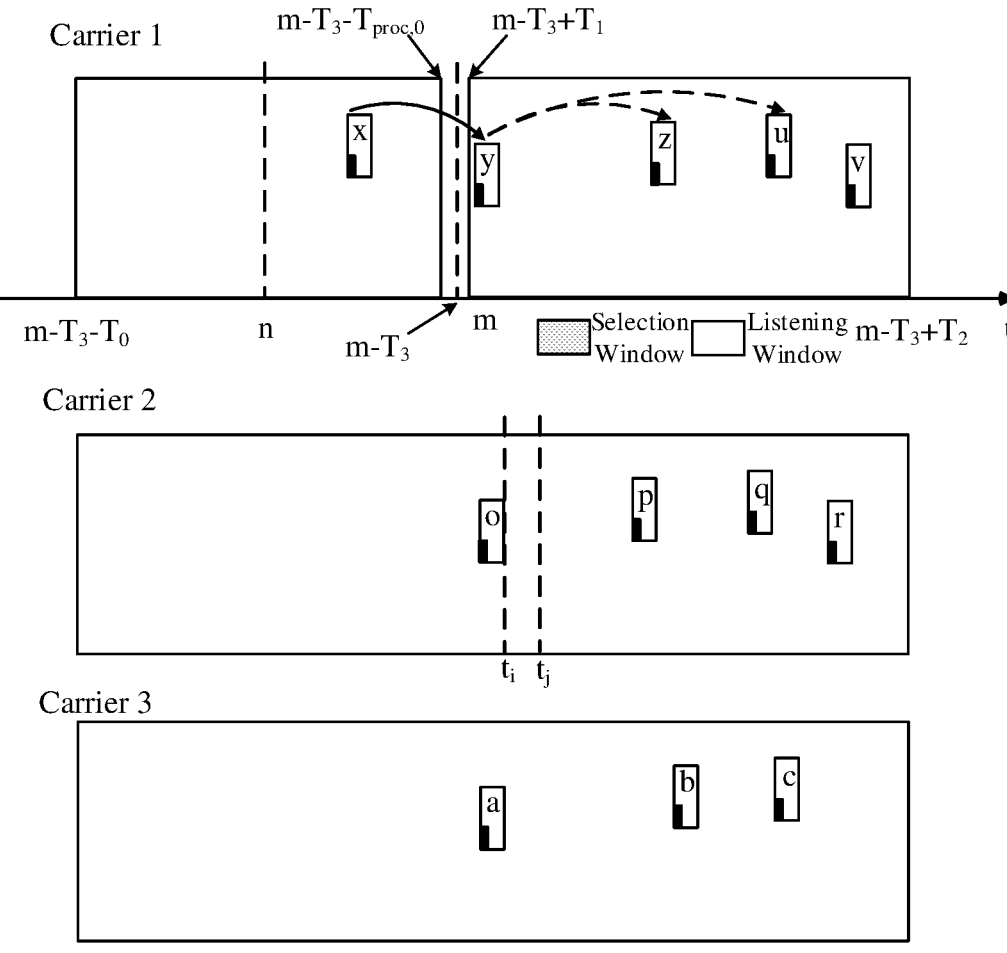
FIG. 8 is a flowchart illustrating a resource selection method in a carrier aggregation scenario according to an embodiment of the present disclosure.
FIG. 9 is a schematic diagram showing a resource selection scheme in the embodiment of FIG. 8.

Referring to FIG. 8, which is a flowchart illustrating a resource selection method in a carrier aggregation scenario according to an embodiment of the present disclosure. The method can be applied to the network architecture shown in FIG. 1. For example, the method can be performed by a terminal device. The method may include the step of:

at Step 810, evaluating target resources in a target resource set at a second time instant according to a selected resource or scheduled resource on a second carrier.

Here, the target resource set includes a selected resource on a first carrier as indicated at a first time instant, and the second time instant is earlier than the first time instant.

Optionally, the first time instant may be a time unit where any selected resource is located. Optionally, the time unit may be a time slot, or a subframe or an Orthogonal Frequency Division Multiplexing (OFDM) symbol, etc., and the present disclosure is not limited to this. A certain time instant in the present disclosure may refer to a time point corresponding to the time instant, or may refer to a time unit where the time instant is located, such as a time slot, subframe, or OFDM symbol to which the time instant belongs.

Referring to FIG. 9, the first time instant may be time slot m, and the second time instant is earlier than the first time instant. For example, the second time instant may be time slot m−$T_3$. Taking the first carrier as carrier 1 shown in FIG. 9 as an example, on carrier 1, the terminal device triggers resource selection (or resource reselection, or high-layer triggers the physical layer to report a candidate resource set) in time slot n, and the terminal device selects Resources x, y, z, u, and v. For the resources in the target resource set (the target resource set includes the selected resources on carrier 1 as indicated in time slot m), in time slot m−$T_3$, the terminal device evaluates the target resources in the target resource set according to a selected resource or scheduled resource on carrier 2 and/or carrier 3. For example, the terminal device determines whether to reselect the target resources.

Optionally, the second time instant may be the first time instant minus a first offset, or the second time instant may be the first time instant minus a first offset and a second offset. Taking the first time instant as time slot m as an example, in an example, the second time instant is time slot m−$T_3$, and $T_3$ is the first offset. For example, $T_3$ is a value greater than 0. In another example, the second time instant may be time slot m−$T_3$−$T_r$, where $T_3$ is the first offset, and $T_r$ is the second offset. For example, $T_3$ is a value greater than 0. For the value of $T_r$, reference can be made to the description below. In addition, in FIG. 9, only the case where the second time instant is time slot m−$T_3$ is exemplarily shown, and the case where the second time instant is time slot m−$T_3$−$T_r$ is not shown in FIG. 9.

Optionally, for the above first offset $T_3$, the first offset $T_3$ may be a predetermined value specified in a standard, configured by a network, or pre-configured, or may depend on an implementation of the terminal device. In an example, the first offset $T_3$ may be an offset determined from a plurality of candidate offsets based on a subcarrier spacing. For example, the first offset may be $T_{proc,0}$ or $T_{proc,1}$, and for $T_{proc,0}$ and $T_{proc,1}$, reference can be made to the above introduction.

Optionally, for the above second offset $T_r$, the second offset $T_r$ may be a random offset. Optionally, the second offset $T_r$ may be greater than 0, and/or the second offset $T_r$ may be smaller than or equal to $T_{max}$, where $T_{max}$ is a predetermined value specified in a standard, is configured by a network, is pre-configured, or depends on an implementation of the terminal device.

Optionally, the second carrier may be different from the first carrier, and the second carrier may be one carrier, or may include a plurality of carriers. For example, in FIG. 9, the first carrier may be carrier 1, and the second carrier may include carrier 2 and/or carrier 3.

In an exemplary embodiment, the target resource set may include one of:

(1) a selected resource on the first carrier for transmission at the first time instant; (For example, in FIG. 9, the first time instant is time slot m, and the target resource set includes Resource y on carrier 1 for transmission in time slot m.);

(2) a selected resource on the first carrier as indicated at the first time instant (Here, the indicated selected resource refers to the selected resource indicated in the first sidelink control information. For example, in FIG. 9, the first time instant is m, and the target resource set includes Resources y, z, and u indicated by transmitting the first sidelink control information on Resource y. In one example, the indicated selected resource is the selected resource indicated in "Time resource assignment" and "Frequency resource assignment" fields in the first sidelink control information. For example, in FIG. 9, the first time instant is m, the target resource set includes Resources y, z, and u indicated by transmitting the first sidelink control information on Resource y, and indicated in the "Time resource assignment" and "Frequency resource assignment" fields in the first sidelink control information.);

(3) a selected resource on the first carrier as indicated at the first time instant and not indicated before the first time instant (For example, in FIG. 9, the first time instant is m, and the target resource set includes Resources z and u indicated by transmitting the sidelink control information on Resource y and not indicated by any first sidelink control information transmitted previously. In one example, the target resource set includes the selected resource on the first carrier as indicated in the "Time The resource assignment" and "Frequency resource assignment" fields in the first sidelink control information at the first time instant and not indicated in any first sidelink control information before the first time instant.); or (4) a selected resource on the first carrier as indicated at the first time instant and indicated before the first time instant (For example, in FIG. 9, the first time instant is m, and the target resource set includes Resource y indicated by transmitting the first sidelink control information on Resource y and indicated in previously transmitted first sidelink control information. In an example, the target resource set includes the selected resource on the first carrier as indicated in the "Time The resource assignment" and "Frequency resource assignment" fields in the first sidelink control information at the first time instant and indicated in first sidelink control information before the first time instant.).

In an exemplary embodiment, the above step 810 may include the following steps:

a first exclusion step of determining a resource selection window and a resource listening window corresponding to the first carrier at the second time instant, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting, for a target resource in the target resource set, the target resource from the second resource set when the target resource is not in the second resource set.

In the embodiment of the present disclosure, the first exclusion step may be the Step 1 introduced above. For the details of Step 1, reference can be made to the above description. Here, only a general description of Step 1 is given to indicate the timing relation between the steps.

S1. Initialize all available resources in the resource selection window as a resource set A, and the number of all available resources in the resource set A is denoted as $M_{total}$;

S2. Perform resource exclusion on the resource set A according to the non-listened time slots in the resource listening window (Step 1-1). Optionally, this step may or may not be performed depending on whether the inter-TB reservation is activated for the resource pool;

S3. Exclude the resources in the resource set A according to the first sidelink control information detected in the resource listening window (Step 1-2);

S4. If the remaining resources in the resource set A are less than $M_{total}*X$, increase the RSRP threshold by LdB (L is a value greater than 0, e.g., L=3), and perform Step 1 again.

During or after the first exclusion step, the terminal device performs the second exclusion step. That is, the terminal device performs the second exclusion step during or after Step 1. For example, the first exclusion step includes S1-S4 in the above Step 1. In the example where the second exclusion step is performed during Step 1, the order in which the steps are performed may be S1, the second exclusion step, S2, S3, and S4, or S1, S2, S3, the second exclusion step, and S4, and the present disclosure is not limited to any of these examples. In another example, in the example where the second exclusion step is performed after Step 1, the order in which the steps are performed may be Step 1 (including S1, S2, S3 and S4 in sequence) and the second exclusion step. Here, Step 1 may be performed once, or may be performed multiple times, and the second exclusion step may be performed only once. In addition, the second exclusion step is to exclude resources in the first resource set.

Optionally, the first resource set may include one of:

(1) a set of all available resources in the resource selection window (For example, a set of all available resources belonging to the resource pool used by the terminal device in the resource selection window.);

(2) a set of remaining resources obtained by excluding the available resource in the resource selection window based on the listening result in the resource listening window;

(3) a set of remaining resources obtained by excluding the available resource in the resource selection window based on the non-listened time slot in the resource listening window; or (4) a set of remaining resources obtained by excluding the available resource in the resource selection window based on the listening result and the non-listened time slot in the resource listening window.

That is, the first resource set can be the above initial resource set A, or the resource set A after Step 1-1 is completed, or the resource set A after Step 1-2 is completed, or the resource set A after Step 1 is completed.

Optionally, the second exclusion step may be performed for one of:

(1) any resource in the first resource set;

(2) any of the first a resources in terms of time domain positions in the first resource set, where a is a positive integer; where a may be a predetermined value specified in a standard, or configured by a network, or pre-configured, or may depend on the implementation of the terminal device;

(3) any of the first b % resources in terms of time domain positions in the first resource set, where b is a value greater than 0; where b can be a predetermined value specified in a standard, or configured by a network, or pre-configured, or may depend on the implementation of the terminal device (optionally, b % is relative to the number of resources included in the first resource set); or (4) any resource in the first resource set that has a time domain position smaller than or equal to a third time instant, the third time instant being the second time instant plus a third offset (Referring to the above introduction, the second time instant is time slot $m-T_3$ or time slot $m-T_3-T_r$, then the third time instant is time slot $m-T_3+c$ or time slot $m-T_3-T_r+c$, where c represents the third offset, and c can be a predetermined value specified in a standard, or configured by a network, or pre-configured, or may depend on the implementation of the terminal device. Optionally, the third time instant is greater than or equal to the time instant corresponding to the last resource in the target resource set in the time domain, so as to ensure that the resources in the target resource set can be more comprehensively evaluated during the resource exclusion process, thereby determining whether it conflicts with selected or scheduled resources on other carriers.

If the terminal device determines that a certain resource in the first resource set cannot be used for transmission on the first carrier according to the selected resource or scheduled resource on the second carrier, the terminal device excludes the resource from the first resource set. Exemplarily, the terminal device may determine that the resource in the first resource set cannot be used for transmission on the first carrier according to the selected resource or the scheduled resource on the second carrier based on at least one of the following factors:

(1) The Number of Carriers for Simultaneous Transmissions Supported by the Terminal Device For example, in FIG. 9, the terminal device only supports simultaneous transmissions on two carriers, and the terminal device has selected Resources o and a on carrier 2 and carrier 3 respectively, and Resources o and a overlap a resource in the first resource set in the time domain. The terminal device determines that transmission on the resource on carrier 1 is not supported, and needs to exclude the resource from the first resource set.

(2) Limitations of Carrier Aggregation or Combination

For example, in FIG. 9, the terminal device does not support aggregation or combination on carrier 1 and carrier 2, that is, it cannot transmit on carrier 1 when transmitting on carrier 2. If the terminal device selects Resource o on carrier 2, and Resource o overlaps a resource in the first resource set in the time domain, then the terminal device determines that transmission on the resource on carrier 1 is not supported, and needs to exclude the resource from the first resource set.

(3) Interruption Due to RF Readjustment

For example, in FIG. 9, the terminal device does not support aggregation or combination on carrier 1 and carrier 2, that is, it cannot transmit on carrier 1 when transmitting on carrier 2. If it needs to transmit on carrier 1 after the transmission on carrier 2 is completed, it needs to readjust hardware or RF of the device before transmitting on carrier 1. During the readjustment period, the terminal device cannot transmit. After the terminal device transmits on Resource o on carrier 2, it needs to perform RF adjustment in time slots $t_i$ to $t_j$. If the resource in the first resource set overlaps time slots $t_i$ to $t_j$ in the time domain, then terminal device determines that transmission on the resource on carrier 1 is not supported, and needs to exclude the resource from the first resource set.

In another example, the terminal device supports two sets of radio frequencies, or two RF chains. Radio frequency chain 1 is used for transmission on carrier 1 and carrier 2, and radio frequency chain 2 is used for transmission on carrier 3. Therefore, the terminal device needs to adjust the radio frequency chain 1 to support the transmission on the two carriers. Similarly, if the time for the terminal device to perform RF readjustment after transmission on Resource o on carrier 2 overlaps a resource in the first resource set in the time domain, the terminal device determines that transmission on the resource on carrier 1 is not supported, and needs to exclude the resource from the first resource set.

In an embodiment of the present disclosure, the resource set obtained by performing the first and second exclusion steps is referred to as the second resource set. For the target resource in the target resource set, if the target resource is not in the second resource set, the terminal device reselects the target resource in the second resource set.

For example, the target resource set includes Resource y in FIG. 9, and if Resource y is not included in the second resource set obtained by performing the first and second exclusion steps, Resource y is reselected from the second resource set.

As another example, the target resource set includes Resources y, z, and u in FIG. 9, and if Resource z is not in the second resource set obtained by performing the first and second exclusion steps, Resource z is reselected from the second resource set.

In another example, the target resource set includes Resources z and u in FIG. 9, and if neither resource z nor u is in the second resource set obtained by performing the first and second exclusion steps, Resources z and u are reselected from the second resource set.

It should be noted that, the above first exclusion step and second exclusion step may be performed once, or may be performed multiple times. In the example where the second exclusion step is performed during the first exclusion step (i.e., Step 1), if after a round of exclusion steps (for example, after S1, the second exclusion step, S2, S3, and S4 are performed sequentially or after S1, S2, S3, the second exclusion step, and S4 are performed sequentially), the remaining resources in the resource set obtained are less than $M_{total}*X$, then the RSRP threshold is increased by a certain value, and then a new round of exclusion steps are performed. Finally, after several rounds of the exclusion steps, if the remaining resources in the finally obtained resource set are more than or equal to $M_{total}*X$, then this resource set is determined as the second resource set. Alternatively, in the example where the second exclusion step is performed after the first exclusion step (i.e., Step 1), then due to the existence of S4, Step 1 may be performed multiple times, after the resource set having remaining resources more than or equal to $M_{total}*X$ is obtained, the second exclusion step is performed once, and the resource set obtained by performing the second exclusion step is the second resource set. It should be noted that if the second exclusion step is performed during the first exclusion step (i.e., Step 1), the number of resources in the second resource set is greater than or equal to $M_{total}*X$; but if the first exclusion step (that is, Step 1) is performed and then the second exclusion step is performed, the number of resources in the second resource set is not necessarily greater than or equal to $M_{total}*X$, and may be smaller than $M_{total}*X$.

In another exemplary embodiment, the above step 810 includes the following step: reselecting, for a target resource in the target resource set, the target resource when the target resource is determined to be unusable for transmission on the first carrier at the second time instant based on the selected resource or scheduled resource on the second carrier.

Exemplarily, the terminal device may determine the target resource to be unusable for transmission on the first carrier based on the selected resource or scheduled resource on the second carrier according to at least one of the following factors:

(1) The number of Carriers for Simultaneous Transmissions Supported by the Terminal Device For example, in FIG. 9, the terminal device only supports simultaneous transmissions on two carriers, and the terminal device has selected Resources o and a on carrier 2 and carrier 3 respectively, and Resources o and a overlap the target resource in the target resource set in the time domain. The terminal device determines that transmission on the target resource on carrier 1 is not supported, and reselects the target resource in the target resource set.

(2) Limitations of Carrier Aggregation or Combination

For example, in FIG. 9, the terminal device does not support aggregation or combination on carrier 1 and carrier 2, that is, it cannot transmit on carrier 1 when transmitting on carrier 2. If the terminal device selects Resource o on carrier 2, and Resource o overlaps the target resource in the target resource set in the time domain, then the terminal device determines that transmission on the target resource on carrier 1 is not supported, and reselects the target resource in the target resource set.

(3) Interruption Due to RF Readjustment

For example, in FIG. 9, the terminal device does not support aggregation or combination on carrier 1 and carrier 2, that is, it cannot transmit on carrier 1 when transmitting on carrier 2. If it needs to transmit on carrier 1 after the transmission on carrier 2 is completed, it needs to readjust hardware or RF of the device before transmitting on carrier 1. During the readjustment period, the terminal device cannot transmit. After the terminal device transmits on Resource o on carrier 2, it needs to perform RF adjustment in time slots $t_i$ to $t_j$. If the target resource in the target resource set overlaps time slots $t_i$ to $t_j$ in the time domain, then terminal device determines that transmission on the resource on carrier 1 is not supported, and reselects the target resource in the target resource set.

In another example, the terminal device supports two sets of radio frequencies, or two RF chains. Radio frequency chain 1 is used for transmission on carrier 1 and carrier 2, and radio frequency chain 2 is used for transmission on carrier 3. Therefore, the terminal device needs to adjust the radio frequency chain 1 to support the transmission on the two carriers. Similarly, if the time for the terminal device to perform RF readjustment after transmission on Resource o on carrier 2 overlaps the target resource in the target resource set in the time domain, the terminal device determines that transmission on the resource on carrier 1 is not supported, and reselects the target resource in the target resource set.

For example, in FIG. 9, the target resource set includes Resource y, and if the terminal device determines that transmission on Resource y on carrier 1 is not supported according to the selected resource or scheduled resource on another carrier (including carrier 2 and/or carrier 3), then the terminal device reselects Resource y.

As another example, in FIG. 9, the target resource set includes Resources y, z, and u. If the terminal device determines that transmission on Resource z on carrier 1 is not supported according to the selected resource or scheduled resource on another carrier (including carrier 2 and/or carrier 3), the terminal device reselects Resource z.

As another example, in FIG. 9, the target resource set includes Resources y, z, and u. If the terminal device determines that transmission on Resources z and u on carrier 1 is not supported according to the selected resource or scheduled resource on another carrier (including carrier 2 and/or carrier 3), the terminal device reselects Resource z and Resource u.

In addition, for the target resource in the target resource set that is unusable for transmission on the first carrier, the terminal device reselecting the target resource may include the following steps:

a first exclusion step of determining a resource selection window and a resource listening window corresponding to the first carrier, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting the target resource from the second resource set.

In the embodiment of the present disclosure, the first exclusion step may be the Step 1 introduced above. For the details of Step 1, reference can be made to the above description. Here, only a general description of Step 1 is given to indicate the timing relation between the steps.

S1. Initialize all available resources in the resource selection window as a resource set A, and the number of all available resources in the resource set A is denoted as $M_{total}$;

S2. Perform resource exclusion on the resource set A according to the non-listened time slots in the resource listening window (Step 1-1). Optionally, this step may or may not be performed depending on whether the inter-TB reservation is activated for the resource pool;

S3. Exclude the resources in the resource set A according to the first sidelink control information detected in the resource listening window (Step 1-2);

S4. If the remaining resources in the resource set A are less than $M_{total}*X$, increase the RSRP threshold by LdB (L is a value greater than 0, e.g., L=3), and perform Step 1 again.

During or after the first exclusion step, the terminal device performs the second exclusion step. That is, the terminal device performs the second exclusion step during or after Step 1. For example, the first exclusion step includes S1~S4 in the above Step 1. In the example where the second exclusion step is performed during Step 1, the order in which the steps are performed may be S1, the second exclusion step, S2, S3, and S4, or S1, S2, S3, the second exclusion step, and S4, and the present disclosure is not limited to any of these examples. In another example, in the example where the second exclusion step is performed after Step 1, the order in which the steps are performed may be Step 1 (including S1, S2, S3 and S4 in sequence) and the second exclusion step. Here, Step 1 may be performed once, or may be performed multiple times, and the second exclusion step may be performed only once. In addition, the second exclusion step is to exclude resources in the first resource set.

Optionally, the first resource set may include one of:

(1) a set of all available resources in the resource selection window (For example, a set of all available resources belonging to the resource pool used by the terminal device in the resource selection window.);

(2) a set of remaining resources obtained by excluding the available resource in the resource selection window based on the listening result in the resource listening window;

(3) a set of remaining resources obtained by excluding the available resource in the resource selection window based on the non-listened time slot in the resource listening window; or (4) a set of remaining resources obtained by excluding the available resource in the resource selection window based on the listening result and the non-listened time slot in the resource listening window.

That is, the first resource set can be the above initial resource set A, or the resource set A after Step 1-1 is completed, or the resource set A after Step 1-2 is completed, or the resource set A after Step 1 is completed.

Optionally, the second exclusion step may be performed for one of:

(1) any resource in the first resource set;

(2) any of the first a resources in terms of time domain positions in the first resource set, where a is a positive integer; where a may be a predetermined value specified in a standard, or configured by a network, or pre-configured, or may depend on the implementation of the terminal device;

(3) any of the first b % resources in terms of time domain positions in the first resource set, where b is a value greater than 0; where b can be a predetermined value specified in a standard, or configured by a network, or pre-configured, or may depend on the implementation of the terminal device (optionally, b % is relative to the number of resources included in the first resource set); or (4) any resource in the first resource set that has a time domain position smaller than or equal to a third time instant, the third time instant being the second time instant plus a third offset (Referring to the above introduction, the second time instant is time slot $m-T_3$ or time slot $m-T_3-T_r$, then the third time instant is time slot $m-T_3+c$ or time slot $m-T_3-T_r+c$, where c represents the third offset, and c can be a predetermined value specified in a standard, or configured by a network, or pre-configured, or may depend on the implementation of the terminal device. Optionally, the third time instant is greater than or equal to the time instant corresponding to the last resource in the target resource set in the time domain.

If the terminal device determines that a certain resource in the first resource set cannot be used for transmission on the first carrier according to the selected resource or scheduled resource on the second carrier, the terminal device excludes the resource from the first resource set. Exemplarily, the terminal device may determine that the resource in the first resource set cannot be used for transmission on the first carrier according to the selected resource or the scheduled resource on the second carrier based on at least one of the following factors:

(1) The number of carriers for simultaneous transmissions supported by the terminal device;

(2) Limitations of Carrier Aggregation or Combination; or (3) Interruption due to RF readjustment.

In an embodiment of the present disclosure, the resource set obtained by performing the first and second exclusion steps is referred to as the second resource set. After the terminal device obtains the second resource set, for the target resource in the target resource set that is unusable for transmission on the first carrier, the terminal device reselects the target resource in the second resource set.

It should be noted that, the above first exclusion step and second exclusion step may be performed once, or may be performed multiple times. In the example where the second exclusion step is performed during the first exclusion step (i.e., Step 1), if after a round of exclusion steps (for example, after S1, the second exclusion step, S2, S3, and S4 are performed sequentially or after S1, S2, S3, the second exclusion step, and S4 are performed sequentially), the remaining resources in the resource set obtained are less than $M_{total}i*X$, then the RSRP threshold is increased by a certain value, and then a new round of exclusion steps are performed. Finally, after several rounds of the exclusion steps, if the remaining resources in the finally obtained resource set are more than or equal to $M_{total}i*X$, then this resource set is determined as the second resource set. Alternatively, in the example where the second exclusion step is performed after the first exclusion step (i.e., Step 1), then due to the existence of S4, Step 1 may be performed multiple times, after the resource set having remaining resources more than or equal to $M_{total}*X$ is obtained, the second exclusion step is performed once, and the resource set obtained by performing the second exclusion step is the second resource set. It should be noted that if the second exclusion step is performed during the first exclusion step (i.e., Step 1), the number of resources in the second resource set is greater than or equal to $M_{total}*X$; but if the first exclusion step (that is, Step 1) is performed and then the second exclusion step is performed, the number of resources in the second resource set is not necessarily greater than or equal to $M_{total}*X$, and may be smaller than $M_{total}*X$.

The present disclosure proposes that the selected resource on the current carrier is evaluated according to the latest selected resource or scheduled resource on another carrier, at least before transmission on the selected resource of the current carrier (e.g., before indication of or transmission on the selected resource of the current carrier). If the currently selected resource cannot be used for transmission, resource reselection can be triggered. In this way, the problem of inaccurate resource exclusion when the terminal device initially selects resources can be solved, and the accuracy of resource selection in the carrier aggregation scenario can be improved.

Referring to FIG. 10, which is a flowchart illustrating a resource selection method in a carrier aggregation scenario according to another embodiment of the present disclosure. The method can be applied to the network architecture shown in FIG. 1. For example, the method can be performed by a terminal device. The method may include the following steps (1010~1030):

Step 1010: a first exclusion step of determining a resource selection window and a resource listening window corresponding to a first carrier, and excluding an available resource in the resource selection window based on a listening result and/or a non-listened time slot in the resource listening window;

Step 1020: a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step; and Step 1030: selecting a transmission resource from the second resource set.

With reference to FIG. 11, the terminal device triggers resource selection (or resource reselection, or a higher layer triggers a physical layer to report a candidate resource set) in time slot n. The terminal device determines a resource listening window from $n-T_0$ to $n-T_{proc,0}$ (optionally, $n-T_{proc,0}$ is not included) and a resource selection window from $n+T_1$ to $n+T_2$. The terminal device performs the first exclusion step, and performs the second exclusion step to exclude the resources in the first resource set during the first exclusion step or after the first exclusion step.

In the embodiment of the present disclosure, the first exclusion step may be the Step 1 introduced above. For the details of Step 1, reference can be made to the above description. Here, only a general description of Step 1 is given to indicate the timing relation between the steps.

S1. Initialize all available resources in the resource selection window as a resource set A, and the number of all available resources in the resource set A is denoted as $M_{total}$;

S2. Perform resource exclusion on the resource set A according to the non-listened time slots in the resource listening window (Step 1-1). Optionally, this step may or may not be performed depending on whether the inter-TB reservation is activated for the resource pool;

S3. Exclude the resources in the resource set A according to the first sidelink control information detected in the resource listening window (Step 1-2);

S4. If the remaining resources in the resource set A are less than $M_{total}*X$, increase the RSRP threshold by LdB (L is a value greater than 0, e.g., L=3), and perform Step 1 again.

During or after the first exclusion step, the terminal device performs the second exclusion step. That is, the terminal device performs the second exclusion step during or after Step 1. For example, the first exclusion step includes S1~S4 in the above Step 1. In the example where the second exclusion step is performed during Step 1, the order in which the steps are performed may be S1, the second exclusion step, S2, S3, and S4, or S1, S2, S3, the second exclusion step, and S4, and the present disclosure is not limited to any of these examples. In another example, in the example where the second exclusion step is performed after Step 1, the order in which the steps are performed may be Step 1 (including S1, S2, S3 and S4 in sequence) and the second exclusion step. Here, Step 1 may be performed once, or may be performed multiple times, and the second exclusion step may be performed only once. In addition, the second exclusion step is to exclude resources in the first resource set.

Optionally, the first resource set may include one of:

(1) a set of all available resources in the resource selection window (For example, a set of all available resources belonging to the resource pool used by the terminal device in the resource selection window.);

(2) a set of remaining resources obtained by excluding the available resource in the resource selection window based on the listening result in the resource listening window;

(3) a set of remaining resources obtained by excluding the available resource in the resource selection window based on the non-listened time slot in the resource listening window; or (4) a set of remaining resources obtained by excluding the available resource in the resource selection window based on the listening result and the non-listened time slot in the resource listening window.

That is, the first resource set can be the above initial resource set A, or the resource set A after Step 1-1 is completed, or the resource set A after Step 1-2 is completed, or the resource set A after Step 1 is completed.

Optionally, the second exclusion step may be performed for one of:

(1) any resource in the first resource set;

(2) any of the first a resources in terms of time domain positions in the first resource set, where a is a positive integer; where a may be a predetermined value specified in a standard, or configured by a network, or pre-configured, or may depend on the implementation of the terminal device;

(3) any of the first b % resources in terms of time domain positions in the first resource set, where b is a value greater than 0; where b can be a predetermined value specified in a standard, or configured by a network, or pre-configured, or may depend on the implementation of the terminal device (optionally, b % is relative to the number of resources included in the first resource set); or (4) any resource in the first resource set that has a time domain position smaller than or equal to a fourth time instant, the fourth time instant being a trigger time instant plus a fourth offset (The trigger time instant includes one of: a time instant at which resource selection is triggered, a time instant at which resource reselection is triggered, or a time instant at which a higher layer triggers a physical layer to report a candidate resource set. Optionally, the fourth offset may be a value greater than 0, and the fourth offset can be a predetermined value specified in a standard, or configured by a network, or pre-configured, or may depend on the implementation of the terminal device.).

If the terminal device determines that a certain resource in the first resource set cannot be used for transmission on the first carrier according to the selected resource or scheduled resource on the second carrier, the terminal device excludes the resource from the first resource set. Exemplarily, the terminal device may determine that the resource in the first resource set cannot be used for transmission on the first carrier according to the selected resource or the scheduled resource on the second carrier based on at least one of the following factors:

(1) The Number of Carriers for Simultaneous Transmissions Supported by the Terminal Device For example, in FIG. 11, the terminal device only supports simultaneous transmissions on two carriers, and the terminal device has selected Resources o and a on carrier 2 and carrier 3 respectively, and Resources o and a overlap a resource in the first resource set in the time domain. The terminal device determines that transmission on the resource on carrier 1 is not supported, and needs to exclude the resource from the first resource set.

(2) Limitations of Carrier Aggregation or Combination

For example, in FIG. 11, the terminal device does not support aggregation or combination on carrier 1 and carrier 2, that is, it cannot transmit on carrier 1 when transmitting on carrier 2. If the terminal device selects Resource o on carrier 2, and Resource o overlaps a resource in the first resource set in the time domain, then the terminal device determines that transmission on the resource on carrier 1 is not supported, and needs to exclude the resource from the first resource set.

(3) Interruption Due to RF Readjustment

For example, in FIG. 11, the terminal device does not support aggregation or combination on carrier 1 and carrier 2, that is, it cannot transmit on carrier 1 when transmitting on carrier 2. If it needs to transmit on carrier 1 after the transmission on carrier 2 is completed, it needs to readjust hardware or RF of the device before transmitting on carrier 1. During the readjustment period, the terminal device cannot transmit. After the terminal device transmits on Resource o on carrier 2, it needs to perform RF adjustment in time slots $t_i$ to $t_j$. If the resource in the first resource set overlaps time slots $t_i$ to $t_j$ in the time domain, then terminal device determines that transmission on the resource on carrier 1 is not supported, and needs to exclude the resource from the first resource set.

In another example, the terminal device supports two sets of radio frequencies, or two RF chains. Radio frequency chain 1 is used for transmission on carrier 1 and carrier 2, and radio frequency chain 2 is used for transmission on carrier 3. Therefore, the terminal device needs to adjust the radio frequency chain 1 to support the transmission on the two carriers. Similarly, if the time for the terminal device to perform RF readjustment after transmission on Resource o on carrier 2 overlaps a resource in the first resource set in the time domain, the terminal device determines that transmission on the resource on carrier 1 is not supported, and needs to exclude the resource from the first resource set.

In an embodiment of the present disclosure, the resource set obtained by performing the first and second exclusion steps is referred to as the second resource set. After obtaining the second resource set, the terminal device selects a transmission resource from the second resource set, e.g., randomly selects a transmission resource from the second resource set. Optionally, the physical layer reports the second resource set to a higher layer, and the high layer selects a transmission resource from the second resource set, e.g., the higher layer randomly selects a transmission resource from the second resource set.

It should be noted that, the above first exclusion step and second exclusion step may be performed once, or may be performed multiple times. In the example where the second exclusion step is performed during the first exclusion step (i.e., Step 1), if after a round of exclusion steps (for example, after S1, the second exclusion step, S2, S3, and S4 are performed sequentially or after S1, S2, S3, the second exclusion step, and S4 are performed sequentially), the remaining resources in the resource set obtained are less than $M_{total}*X$, then the RSRP threshold is increased by a certain value, and then a new round of exclusion steps are performed. Finally, after several rounds of the exclusion steps, if the remaining resources in the finally obtained resource set are more than or equal to $M_{total}*X$, then this resource set is determined as the second resource set.

Alternatively, in the example where the second exclusion step is performed after the first exclusion step (i.e., Step 1), then due to the existence of S4, Step 1 may be performed multiple times, after the resource set having remaining resources more than or equal to $M_{total}*X$ is obtained, the second exclusion step is performed once, and the resource set obtained by performing the second exclusion step is the second resource set. It should be noted that if the second exclusion step is performed during the first exclusion step (i.e., Step 1), the number of resources in the second resource set is greater than or equal to $M_{total}*X$; but if the first exclusion step (that is, Step 1) is performed and then the second exclusion step is performed, the number of resources in the second resource set is not necessarily greater than or equal to $M_{total}*X$, and may be smaller than $M_{total}*X$.

For the carrier aggregation scenario, in the present disclosure, during or after the first exclusion step for the current carrier (that is, for excluding the available resources in the resource selection window based on the listening result and/or the non-listened time slot in the resource listening window), according to the selected resource or scheduled resource on another carrier, the candidate resources at early time domain positions on the current carrier are evaluated to solve the problem that a large number of candidate resources are excluded, thereby avoiding degradation of the communication reliability of the terminal device due to the small number of selectable resources.

The apparatus embodiments of the present disclosure will be described. The apparatuses can be configured to perform the method embodiments of the present disclosure. For details not disclosed in the apparatus embodiments of the present disclosure, reference can be made to the method embodiments of the present disclosure.

Figure 12:
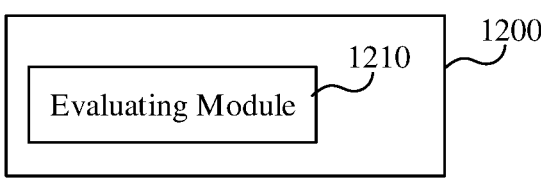
FIG. 12 is a block diagram of a resource selection apparatus in a carrier aggregation scenario according to an embodiment of the present disclosure.

Reference is now made to FIG. 12, which shows a block diagram of a resource selection apparatus in a carrier aggregation scenario according to an embodiment of the present disclosure. The apparatus has the function of implementing the above method example, and the function may be implemented by hardware, or by hardware executing corresponding software. The apparatus can be the terminal device described above, or can be provided in the terminal device. As shown in FIG. 12, the apparatus 1200 may include: an evaluating module 1210.

The evaluating module 1210 is configured to evaluate target resources in a target resource set at a second time instant according to a selected resource or scheduled resource on a second carrier.

Here, the target resource set includes a selected resource on a first carrier as indicated at a first time instant, and the second time instant is earlier than the first time instant.

In an exemplary embodiment, the second time instant may be the first time instant minus a first offset, or the second time instant may be the first time instant minus a first offset and a second offset.

Optionally, the first offset may be a predetermined value specified in a standard, configured by a network, or pre-configured, or may depend on an implementation of a terminal device.

Optionally, the second offset may be a random offset.

Optionally, the second offset may be greater than 0, and/or the second offset may be smaller than or equal to $T_{max}$, where $T_{max}$ is a predetermined value specified in a standard, configured by a network, or pre-configured, or depending on an implementation of a terminal device.

Optionally, the target resource set may include one of:
a selected resource on the first carrier for transmission at the first time instant;

a selected resource on the first carrier as indicated at the first time instant;
a selected resource on the first carrier as indicated at the first time instant and not indicated before the first time instant; or
a selected resource on the first carrier as indicated at the first time instant and indicated before the first time instant.

In an exemplary embodiment, the evaluating module 1210 may be configured to:
perform a first exclusion step of determining a resource selection window and a resource listening window corresponding to the first carrier at the second time instant, and excluding an available resource in the resource selection window based on a listening result and/or a non-listened time slot in the resource listening window;
perform a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and
reselect, for a target resource in the target resource set, the target resource from the second resource set when the target resource is not in the second resource set.

In an exemplary embodiment, the evaluating module 1210 may be configured to:
reselect, for a target resource in the target resource set, the target resource when the target resource is determined to be unusable for transmission on the first carrier at the second time instant based on the selected resource or scheduled resource on the second carrier.

Optionally, the evaluating module 1210 may be configured to:
perform a first exclusion step of determining a resource selection window and a resource listening window corresponding to the first carrier, and excluding an available resource in the resource selection window based on a listening result and/or a non-listened time slot in the resource listening window;
perform a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and
reselect the target resource from the second resource set.
Optionally, the first resource set may include one of:
a set of all available resources in the resource selection window;
a set of remaining resources obtained by excluding the available resource in the resource selection window based on the listening result in the resource listening window;
a set of remaining resources obtained by excluding the available resource in the resource selection window based on the non-listened time slot in the resource listening window; or
a set of remaining resources obtained by excluding the available resource in the resource selection window based on the listening result and the non-listened time slot in the resource listening window.

Optionally, the second exclusion step may be performed for one of:

any resource in the first resource set;

any of the first a resources in terms of time domain positions in the first resource set, where a is a positive integer;

any of the first b % resources in terms of time domain positions in the first resource set, where b is a value greater than 0; or any resource in the first resource set that has a time domain position smaller than or equal to a third time instant, the third time instant being the second time instant plus a third offset.

Figure 13:
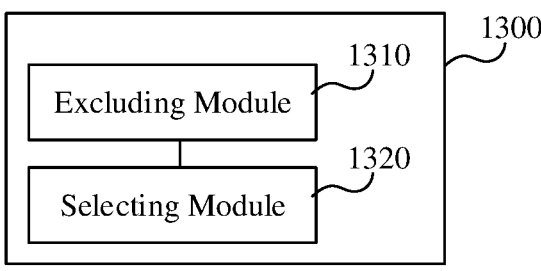
FIG. 13 is a block diagram of a resource selection apparatus in a carrier aggregation scenario according to another embodiment of the present disclosure.

Reference is now made to FIG. 13, which shows a block diagram of a resource selection apparatus in a carrier aggregation scenario according to an embodiment of the present disclosure. The apparatus has the function of implementing the method example, and the function may be implemented by hardware, or by hardware executing corresponding software. The apparatus may be the terminal device described above, or may be provided in the terminal device. As shown in FIG. 13, the apparatus 1300 may include: an excluding module 1310 and a selecting module 1320.

The excluding module 1310 is configured to perform a first exclusion step of determining a resource selection window and a resource listening window corresponding to a first carrier, and excluding an available resource in the resource selection window based on a listening result and/or a non-listened time slot in the resource listening window.

The excluding module 1310 is further configured to perform a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step.

The selecting module 1320 is configured to select a transmission resource from the second resource set.

Optionally, the first resource set may include one of:

a set of all available resources in the resource selection window;

a set of remaining resources obtained by excluding the available resource in the resource selection window based on the listening result in the resource listening window;

a set of remaining resources obtained by excluding the available resource in the resource selection window based on the non-listened time slot in the resource listening window; or a set of remaining resources obtained by excluding the available resource in the resource selection window based on the listening result and the non-listened time slot in the resource listening window.

Optionally, the second exclusion step may be performed for one of:

any resource in the first resource set;

any of the first a resources in terms of time domain positions in the first resource set, where a is a positive integer;

any of the first b % resources in terms of time domain positions in the first resource set, where b is a value greater than 0; or any resource in the first resource set that has a time domain position smaller than or equal to a fourth time instant, the fourth time instant being a trigger time instant plus a fourth offset, the trigger time instant including at least one of: a time instant at which resource selection is triggered, a time instant at which resource reselection is triggered, or a time instant at which a higher layer triggers a physical layer to report a candidate resource set.

It should be noted that, when the apparatus provided in any of the above embodiments achieves its functions, the division of the above functional modules is provided for the purpose of illustration only. In practice, the above functions can be allocated to different functional modules depending one actual requirements. That is, the content/structure of the apparatus can be divided into different functional modules to complete all or part of the functions described above.

Regarding the apparatus in any of the above embodiment, the specific operation of each module has been described in detail in the corresponding method embodiments, and description thereof will be omitted here.

Figure 14:
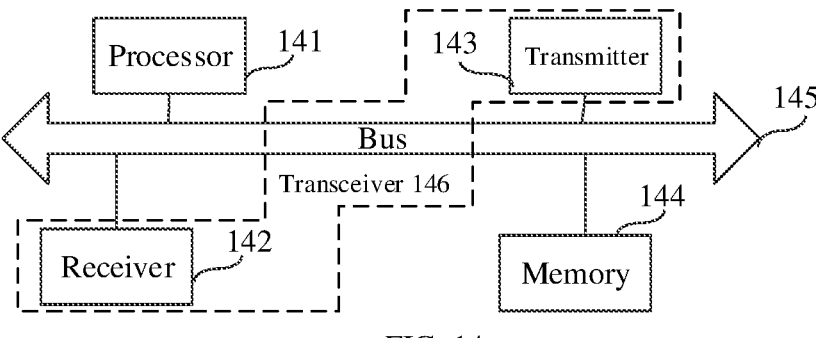
FIG. 14 is a schematic diagram showing a structure of a terminal device according to an embodiment of the present disclosure.

Reference is now made to FIG. 14, which is a schematic diagram showing a structure of a terminal device 140 according to an embodiment of the present disclosure. For example, the terminal device can be configured to perform the above a resource selection method in a carrier aggregation scenario. Specifically, the terminal device 140 may include: a processor 141, a receiver 142, a transmitter 143, a memory 144, and a bus 145.

The processor 141 includes one or more processing cores, and the processor 141 implements various functional applications and information processing by executing software programs and modules.

The receiver 142 and the transmitter 143 may be implemented as a transceiver 146, which may be a communication chip.

The memory 144 is connected to the processor 141 through the bus 145.

The memory 144 can store a computer program, and the processor 141 can be configured to execute the computer program, so as to implement various steps performed by the terminal device in the above method embodiments.

In addition, the memory 144 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

In an exemplary embodiment, the processor 141 is configured to evaluate target resources in a target resource set at a second time instant according to a selected resource or scheduled resource on a second carrier.

The target resource set includes a selected resource on a first carrier as indicated at a first time instant, and the second time instant is earlier than the first time instant.

In another exemplary embodiment, the processor 141 is configured to perform a first exclusion step of determining a resource selection window and a resource listening window corresponding to a first carrier, and excluding an available resource in the resource selection window based on a listening result and/or a non-listened time slot in the resource listening window.

The processor 141 is further configured to perform a second exclusion step of excluding, during or after the first exclusion step, a resource in a first resource set according to a selected resource or scheduled resource on a second carrier, the first resource set being a resource set obtained during or after the first exclusion step, wherein a second resource set is a resource set obtained after the first exclusion step and the second exclusion step.

The processor 141 is further configured to select a transmission resource from the second resource set.

For details not described in detail in the above embodiments, reference may be made to the descriptions in the above method embodiments, and details thereof will be omitted here.

According to an embodiment of the present disclosure, a computer-readable storage medium is provided. The computer-readable storage medium has a computer program stored therein. The computer program is configured to be executed by a processor of a terminal device to perform the above resource selection method in the carrier aggregation scenario.

Optionally, the computer-readable storage medium may include: Read-Only Memory (ROM), Random-Access Memory (RAM), Solid State Drives (SSD), or optical disc, etc. Here, the random access memory may include Resistance Random Access Memory (ReRAM) and Dynamic Random Access Memory (DRAM).

According to an embodiment of the present disclosure, a chip is provided. The chip includes a programmable logic circuit and/or program instructions. The chip is configured to, when running on a terminal device, perform the above resource selection method in the carrier aggregation scenario.

In an aspect of the embodiments of the present disclosure, a computer program product or computer program is provided. The computer program product or computer program includes computer instructions stored in a computer-readable storage medium. A processor of a terminal device is configured to read and execute the computer instructions from the computer-readable storage medium to perform the above resource selection method in the carrier aggregation scenario.

It can be appreciated that the term "indication" as used in the embodiments of the present disclosure may be a direct indication, an indirect indication, or an association. For example, if A indicates B, it may mean that A directly indicates B, e.g., B can be obtained from A. Alternatively, it may mean that A indicates B indirectly, e.g., A indicates C and B can be obtained from C. Alternatively, it may mean that there is an association between A and B.

In the description of the embodiments of the present disclosure, the term "corresponding" may mean that there is a direct or indirect correspondence between the two, or may mean that there is an association between the two, or that they are in a relation of indicating and indicated, configuring or configured, or the like.

The term "plurality" as used herein means two or more. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

In addition, the numbering of the steps described herein only exemplarily shows a possible sequence of execution among the steps. In some other embodiments, the above steps may not be executed according to the order of their numbering. For example, two steps with different numbers may be executed at the same time, or two steps with different numbers may be executed in a reversed order of the one shown in the figure, and the embodiment of the present disclosure is not limited to this.

It can be appreciated by those skilled in the art that, in one or more of the above examples, the functions described in the embodiments of the present disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium. The communication medium includes any medium that facilitates transfer of a computer program from one place to another. The storage medium can be any available medium that can be accessed by a general purpose or special purpose computer.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A resource selection method in a carrier aggregation scenario, the method being performed by a terminal device and the method comprising:

evaluating target resources in a target resource set at a second time instant according to a selected resource or scheduled resource on a second carrier, wherein the target resource set includes a selected resource on a first carrier as indicated at a first time instant, and the second time instant is earlier than the first time instant;

wherein said evaluating the target resources in the target resource set at the second time instant according to the selected resource or scheduled resource on the second carrier comprises:

a first exclusion step of determining a resource selection window and a resource listening window corresponding to the first carrier at the second time instant, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting, for a target resource in the target resource set, the target resource from the second resource set when the target resource is not in the second resource set.

2. The method according to claim 1, wherein the second time instant is the first time instant minus a first offset, or the second time instant is the first time instant minus a first offset and a second offset.

3. The method according to claim 2, wherein the first offset is a predetermined value specified in a standard, is configured by a network, is pre-configured, or depends on an implementation of the terminal device.

4. The method according to claim 2, wherein the second offset is a random offset.

5. The method according to claim 2, wherein the second offset is greater than 0, and/or the second offset is smaller than or equal to $T_{max}$, where $T_{max}$ is a predetermined value specified in a standard, is configured by a network, is pre-configured, or depends on an implementation of the terminal device.

6. The method according to claim 1, wherein the target resource set includes one of:

a selected resource on the first carrier for transmission at the first time instant;

a selected resource on the first carrier as indicated at the first time instant;

a selected resource on the first carrier as indicated at the first time instant and not indicated before the first time instant; or a selected resource on the first carrier as indicated at the first time instant and indicated before the first time instant.

7. The method according to claim 1, wherein said evaluating the target resources in the target resource set at the second time instant according to the selected resource or scheduled resource on the second carrier comprises:

reselecting, for a target resource in the target resource set, the target resource when the target resource is determined to be unusable for transmission on the first carrier at the second time instant based on the selected resource or scheduled resource on the second carrier.

8. The method according to claim 1, wherein the first resource set comprises one of:

a set of all available resources in the resource selection window;

a set of remaining resources obtained by excluding the available resource in the resource selection window based on the listening result in the resource listening window;

a set of remaining resources obtained by excluding the available resource in the resource selection window based on the non-listened time slot in the resource listening window; or a set of remaining resources obtained by excluding the available resource in the resource selection window based on the listening result and the non-listened time slot in the resource listening window.

9. The method according to claim 1, wherein the second exclusion step is performed for one of:

any resource in the first resource set;

any of the first a resources in terms of time domain positions in the first resource set, where a is a positive integer;

any of the first b % resources in terms of time domain positions in the first resource set, where b is a value greater than 0; or any resource in the first resource set that has a time domain position smaller than or equal to a third time instant, the third time instant being the second time instant plus a third offset.

10. The method according to claim 7, wherein said reselecting the target resource comprises:

a first exclusion step of determining a resource selection window and a resource listening window corresponding to the first carrier, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting the target resource from the second resource set.

11. A terminal device, comprising a processor, wherein the processor is configured to evaluate target resources in a target resource set at a second time instant according to a selected resource or scheduled resource on a second carrier, wherein the target resource set includes a selected resource on a first carrier as indicated at a first time instant, and the second time instant is earlier than the first time instant;

wherein said evaluating the target resources in the target resource set at the second time instant according to the selected resource or scheduled resource on the second carrier comprises:

a first exclusion step of determining a resource selection window and a resource listening window corresponding to the first carrier at the second time instant, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting, for a target resource in the target resource set, the target resource from the second resource set when the target resource is not in the second resource set.

12. The terminal device according to claim 11, wherein the second time instant is the first time instant minus a first offset, or the second time instant is the first time instant minus a first offset and a second offset.

13. The terminal device according to claim 12, wherein the first offset is a predetermined value specified in a standard, is configured by a network, is pre-configured, or depends on an implementation of the terminal device.

14. The terminal device according to claim 12, wherein the second offset is a random offset.

15. The terminal device according to claim 12, wherein the second offset is greater than 0, and/or the second offset is smaller than or equal to $T_{max}$, where $T_{max}$ is a predetermined value specified in a standard, is configured by a network, is pre-configured, or depends on an implementation of the terminal device.

16. The terminal device according to claim 11, wherein said evaluating the target resources in the target resource set at the second time instant according to the selected resource or scheduled resource on the second carrier comprises:

reselecting, for a target resource in the target resource set, the target resource when the target resource is determined to be unusable for transmission on the first carrier at the second time instant based on the selected resource or scheduled resource on the second carrier.

17. The terminal device according to claim 16, wherein said reselecting the target resource comprises:

a first exclusion step of determining a resource selection window and a resource listening window corresponding to the first carrier, and excluding an available resource in the resource selection window based on a listening result and/or a non-listened time slot in the resource listening window;

a second exclusion step of excluding, during or after the first exclusion step, a resource in a first resource set according to the selected resource or scheduled resource on the second carrier, the first resource set being a resource set obtained during or after the first exclusion step, wherein a second resource set is a resource set obtained after the first exclusion step and the second exclusion step; and reselecting the target resource from the second resource set.

18. The terminal device according to claim 11, wherein the first resource set comprises one of:

a set of all available resources in the resource selection window;

a set of remaining resources obtained by excluding the available resource in the resource selection window based on the listening result in the resource listening window;

a set of remaining resources obtained by excluding the available resource in the resource selection window based on the non-listened time slot in the resource listening window; or a set of remaining resources obtained by excluding the available resource in the resource selection window based on the listening result and the non-listened time slot in the resource listening window.

19. The terminal device according to claim 11, wherein the second exclusion step is performed for one of:

any resource in the first resource set;

any of the first a resources in terms of time domain positions in the first resource set, where a is a positive integer;

any of the first b % resources in terms of time domain positions in the first resource set, where b is a value greater than 0; or any resource in the first resource set that has a time domain position smaller than or equal to a third time instant, the third time instant being the second time instant plus a third offset.

* * * * *